US009829962B2

(12) United States Patent
Kaushal et al.

(10) Patent No.: US 9,829,962 B2
(45) Date of Patent: *Nov. 28, 2017

(54) HARDWARE AND SOFTWARE ENABLED IMPLEMENTATION OF POWER PROFILE MANAGEMENT INSTRUCTIONS IN SYSTEM ON CHIP

(71) Applicant: NetSpeed Systems, Inc., San Jose, CA (US)

(72) Inventors: Rimu Kaushal, San Jose, CA (US); Anup Gangwar, San Jose, CA (US); Vishnu Mohan Pusuluri, San Jose, CA (US); Sailesh Kumar, San Jose, CA (US)

(73) Assignee: NetSpeed Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,722

(22) Filed: Dec. 18, 2016

(65) Prior Publication Data

US 2017/0097672 A1    Apr. 6, 2017

Related U.S. Application Data

(63) Continuation of application No. 14/620,710, filed on Feb. 12, 2015, now Pat. No. 9,568,970.

(51) Int. Cl.
  *G06F 1/32*    (2006.01)
  *G06F 1/26*    (2006.01)

(52) U.S. Cl.
  CPC .......... *G06F 1/3287* (2013.01); *G06F 1/3296* (2013.01); *G06F 1/26* (2013.01); *G06F 1/3203* (2013.01)

(58) Field of Classification Search
  CPC ............ G06F 1/13; G06F 1/3203; G06F 1/30
  (Continued)

(56) References Cited

U.S. PATENT DOCUMENTS 4,409,838 A    10/1983 Schomberg
4,933,933 A     6/1990 Dally et al.
(Continued)

FOREIGN PATENT DOCUMENTS

CN         103684961 A       3/2014
KR    10-2013-0033898 A1    4/2013
(Continued)

OTHER PUBLICATIONS

Abts, D., et al., Age-Based Packet Arbitration in Large-Radix k-ary n-cubes, Supercomputing 2007 (SC07), Nov. 10-16, 2007, 11 pgs.
(Continued)

*Primary Examiner* — Jaweed A Abbaszadeh
*Assistant Examiner* — Volvick Derose
(74) *Attorney, Agent, or Firm* — Procopio, Cory, Hargreaves & Savitch LLP

(57) ABSTRACT

Aspects of the present disclosure relate to a method and system for hybrid and/or distributed implementation of generation and/or execution of power profile management instructions. An embodiment of the present disclosure provides a hardware element of a SoC/NoC that can be configured to generate and/or execute power profile management instructions using a hybrid combination of software and hardware, wherein the hardware element can be run in parallel with other hardware elements of the SoC/NoC to generate and execute power profile management instructions for different segments or regions of the SoC/NoC for efficient and safe working thereof.

20 Claims, 17 Drawing Sheets

(58) Field of Classification Search
USPC .......................................................... 713/330
See application file for complete search history.

(56) References Cited

U.S. PATENT DOCUMENTS

| | | | |
|---|---|---|---|
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |
| 5,583,990 A | 12/1996 | Birrittella et al. |
| 5,588,152 A | 12/1996 | Dapp et al. |
| 5,764,740 A | 6/1998 | Holender |
| 5,859,981 A | 1/1999 | Levin et al. |
| 5,991,308 A | 11/1999 | Fuhrmann et al. |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,415,282 B1 | 7/2002 | Mukherjea et al. |
| 6,674,720 B1 | 1/2004 | Passint et al. |
| 6,711,717 B2 | 3/2004 | Nystrom et al. |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,590,959 B2 | 9/2009 | Tanaka |
| 7,693,064 B2 | 4/2010 | Thubert et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,020,168 B2 | 9/2011 | Hoover et al. |
| 8,050,256 B1 | 11/2011 | Bao et al. |
| 8,059,551 B2 | 11/2011 | Milliken |
| 8,099,757 B2 | 1/2012 | Riedle et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,448,102 B2 | 5/2013 | Komachuk et al. |
| 8,490,110 B2 | 7/2013 | Hoover et al. |
| 8,492,886 B2 | 7/2013 | Or-Bach et al. |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2003/0088602 A1 | 5/2003 | Dutta et al. |
| 2003/0145314 A1 | 7/2003 | Nguyen et al. |
| 2004/0019814 A1* | 1/2004 | Pappalardo ............. G06F 1/324 713/300 |
| 2004/0049565 A1 | 3/2004 | Keller et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2006/0031615 A1 | 2/2006 | Bruce et al. |
| 2006/0053312 A1* | 3/2006 | Jones ..................... G06F 21/81 713/300 |
| 2006/0075169 A1 | 4/2006 | Harris et al. |
| 2006/0161875 A1* | 7/2006 | Rhee .................. G06F 17/5068 716/122 |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1* | 3/2009 | Watsen ................. H04L 45/127 370/235 |
| 2009/0070726 A1 | 3/2009 | Mehrotra et al. |
| 2009/0122703 A1 | 5/2009 | Gangwal et al. |
| 2009/0172304 A1 | 7/2009 | Gueron et al. |
| 2009/0187716 A1* | 7/2009 | Comparan .......... G06F 12/0833 711/141 |
| 2009/0210184 A1 | 8/2009 | Medardoni et al. |
| 2009/0231348 A1 | 9/2009 | Mejdrich et al. |
| 2009/0268677 A1 | 10/2009 | Chou et al. |
| 2009/0285222 A1 | 11/2009 | Hoover et al. |
| 2009/0300292 A1 | 12/2009 | Fang et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0162019 A1* | 6/2010 | Kumar .................. G06F 1/3203 713/323 |
| 2010/0211718 A1 | 8/2010 | Gratz et al. |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0103799 A1 | 5/2011 | Shacham et al. |
| 2011/0119322 A1* | 5/2011 | Li ....................... G06F 15/7842 709/201 |
| 2011/0154282 A1 | 6/2011 | Chang et al. |
| 2011/0191774 A1 | 8/2011 | Hsu et al. |
| 2011/0235531 A1 | 9/2011 | Vangal et al. |
| 2011/0276937 A1 | 11/2011 | Waller |
| 2011/0302345 A1 | 12/2011 | Boucard et al. |
| 2011/0307734 A1 | 12/2011 | Boesen et al. |
| 2011/0320854 A1 | 12/2011 | Elrabaa |
| 2012/0022841 A1 | 1/2012 | Appleyard |
| 2012/0023473 A1* | 1/2012 | Brown ................ G06F 17/5068 716/133 |
| 2012/0026917 A1 | 2/2012 | Guo et al. |
| 2012/0079147 A1 | 3/2012 | Ishii et al. |
| 2012/0099475 A1 | 4/2012 | Tokuoka |

(56) References Cited

U.S. PATENT DOCUMENTS

| | | | |
|---|---|---|---|
| 2012/0110106 A1 | 5/2012 | De Lescure et al. | |
| 2012/0110541 A1 | 5/2012 | Ge et al. | |
| 2012/0155250 A1 | 6/2012 | Carney et al. | |
| 2012/0173846 A1 | 7/2012 | Wang et al. | |
| 2012/0209944 A1 | 8/2012 | Mejdrich et al. | |
| 2013/0028090 A1* | 1/2013 | Yamaguchi | G06F 1/3206 370/235 |
| 2013/0028261 A1 | 1/2013 | Lee | |
| 2013/0051397 A1 | 2/2013 | Guo et al. | |
| 2013/0054811 A1 | 2/2013 | Harrand | |
| 2013/0080073 A1 | 3/2013 | de Corral | |
| 2013/0086399 A1* | 4/2013 | Tychon | G06F 1/3209 713/320 |
| 2013/0103369 A1 | 4/2013 | Huynh et al. | |
| 2013/0103912 A1 | 4/2013 | Jones et al. | |
| 2013/0117543 A1 | 5/2013 | Venkataramanan et al. | |
| 2013/0148506 A1 | 6/2013 | Lea | |
| 2013/0151215 A1 | 6/2013 | Mustapha | |
| 2013/0159944 A1 | 6/2013 | Uno et al. | |
| 2013/0163615 A1 | 6/2013 | Mangano et al. | |
| 2013/0174113 A1 | 7/2013 | Lecler et al. | |
| 2013/0179613 A1* | 7/2013 | Boucard | H04L 47/10 710/113 |
| 2013/0191572 A1 | 7/2013 | Nooney et al. | |
| 2013/0207801 A1 | 8/2013 | Barnes | |
| 2013/0219148 A1 | 8/2013 | Chen et al. | |
| 2013/0250792 A1 | 9/2013 | Yoshida et al. | |
| 2013/0254488 A1 | 9/2013 | Kaxiras et al. | |
| 2013/0263068 A1 | 10/2013 | Cho et al. | |
| 2013/0268990 A1 | 10/2013 | Urzi et al. | |
| 2013/0326458 A1 | 12/2013 | Kazda et al. | |
| 2014/0068132 A1 | 3/2014 | Philip et al. | |
| 2014/0068134 A1 | 3/2014 | Philip et al. | |
| 2014/0092740 A1 | 4/2014 | Wang et al. | |
| 2014/0098683 A1 | 4/2014 | Kumar et al. | |
| 2014/0112149 A1 | 4/2014 | Urzi et al. | |
| 2014/0115218 A1 | 4/2014 | Philip et al. | |
| 2014/0115298 A1 | 4/2014 | Philip et al. | |
| 2014/0143557 A1* | 5/2014 | Kuesel | G06F 1/26 713/300 |
| 2014/0143558 A1* | 5/2014 | Kuesel | G06F 1/26 713/300 |
| 2014/0211622 A1 | 7/2014 | Kumar et al. | |
| 2014/0232188 A1* | 8/2014 | Cheriyan | G06F 1/3296 307/31 |
| 2014/0254388 A1 | 9/2014 | Kumar et al. | |
| 2014/0254769 A1* | 9/2014 | Chicchetti | A61B 6/563 378/204 |
| 2014/0281243 A1* | 9/2014 | Shalf | G06F 12/0813 711/122 |
| 2015/0348600 A1* | 12/2015 | Bhatia | G11C 5/147 365/189.16 |
| 2015/0370296 A1* | 12/2015 | Purcell | G06F 1/26 714/43 |

FOREIGN PATENT DOCUMENTS

| | | |
|---|---|---|
| WO | 2010074872 A1 | 7/2010 |
| WO | 2013063484 A1 | 5/2013 |
| WO | 2014059024 A1 | 4/2014 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, dated Jan. 22, 2014, 9 pgs.

International Search Report and Written Opinion for PCT/US2014/012003, dated Mar. 26, 2014, 9 pgs.

International Search Report and Written Opinion for PCT/US2014/012012, dated May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

International Search Report and Written Opinion for PCT/US2014/023625, dated Jul. 10, 2014, 9 pgs.

International Search Report and Written Opinion for PCT/US2014/037902, dated Sep. 30, 2014, 14 pgs.

International Search Report and Written Opinion for PCT/US2014/048190, dated Nov. 28, 2014, 11 pgs.

Hestness, J., et al., Netrace: Dependency-Tracking for Efficient Network-on-Chip Experimentation, The University of Texas at Austin, Dept. of Computer Science, May 2011, 20 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

International Search Report and Written Opinion for PCT/US2014/060745, dated Jan. 21, 2015, 10 pgs.

International Search Report and Written Opinion for PCT/US2014/060879, dated Jan. 21, 2015, 10 pgs.

International Search Report and Written Opinion for PCT/US2014/060892, dated Jan. 27, 2015, 10 pgs.

International Search Report and Written Opinion for PCT/US2014/060886, dated Jan. 26, 2015, 10 pgs.

* cited by examiner

HARDWARE AND SOFTWARE ENABLED IMPLEMENTATION OF POWER PROFILE MANAGEMENT INSTRUCTIONS IN SYSTEM ON CHIP

CROSS REFERENCE TO RELATED APPLICATIONS

This application claims benefit under 35 USC §120 and is a Continuation of U.S. patent application Ser. No. 14/620, 710, filed on Feb. 12, 2015, titled "Hardware and Software Enabled Implementation of Power Profile Management Instructions in System on Chip", the content of which is incorporated herein in its entirety by reference for all purposes.

BACKGROUND

Technical Field

Methods and example implementations described herein are directed to an interconnect system on chip architecture, and more specifically, to implementation of a system and method for execution of power profile management instructions for a Network on Chip (NoC) and/or a System on Chip (SoC).

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links denoting connectivity and direction of data flow within the SoC and the NoC.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components, which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to one or more destination components. Components are connected to one or multiple ports of one or multiple routers; with each such port having a unique ID. Packets carry the destination's router and port ID for use by the intermediate routers to route the packet to the destination components.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. For example, shortest path routing may minimize the latency, as such routing reduces the number of hops from a source to one or more destination(s) and/or reduces the cost of routing a packet from the source to destination(s), wherein the cost of routing depends on bandwidth available between one or more intermediate elements/channels. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

With the number of on-chip components growing, and different heterogeneous subsystems placed on chip having different frequency and voltage requirements, efficient and low overhead power management has become more difficult. Specially when one or more elements of the SoC/NoC need to change their power state/mode/profile or voltage profile, a number of actions/operations such as polling of present state of one or more elements, checking dependencies between one or more elements, and changing power and/or voltage state/mode/profile of one or more elements has to be performed to ensure fast switching to take place without loss of data, state, and control.

The problem of power/voltage state switching further complicates as existing heterogeneous resources and subsystems typically have their own power management (PM) protocol, generally developed on an adhoc basis, and therefore lack any standard signaling mechanism. There have been several attempts in past to provide efficient and low overhead power management. Some of the known prior art systems for power management are typically software implemented with limited configurability. Power management of these individual network components on chip, or subsystem on chip or system on chip, requires one or more component to change its power state and switch from one power profile to another power profile based on certain instructions.

Power/voltage profile of SoC is the state of SoC where different components of SoC are in different power state (ON or OFF) or voltage state. The present days SoCs can be configured to operate and support varying power/voltage profiles and it needs to change from one power profile to another based on the function desired to be performed by the SoC. In some cases, a region or segment of the SoC can be in one power state and another region or segment/part can be in another power state. When the SoCs or segments/parts of SoCs change from one power/voltage profile to another, one or more on-chip components/network elements/agents need to change their power/voltage state (for example they may need to go ON/OFF). Such sequence of events taking place while changing the power profile can be referred to as power profile management sequence, power state switching sequence, or power management sequence or power profile management instructions. Power profile management instructions are important in terms of fast switching of network elements from one power profile to another power profile without affecting the circuit on chip. There are several parameters such as SoC design, circuit limitation, interdependency of these components, present power state of one and more components, among others parameters that need to be taken into consideration before deciding the power profile management sequence/instructions.

Existing solutions for power profile management are either hardware based or software based, which have their known disadvantages, wherein hardware based implementations are inflexible in terms of their ability to be configured for new power/voltage states/profiles/modes, and similarly, software based implementations for power profile management are expensive in terms of execution time for performing power/voltage state/profile/mode switching. None of the existing solutions therefore provide generation and execution of power profile management instructions based a hybrid combination of hardware and software for efficient and safe working of SoC/NoC when their hardware elements switch from one power profile to another power profile. Also, as the SoC and/or its hardware elements change from one power/voltage profile to another, there may be certain external events such as interrupts that need to be taken into consideration while executing the power/voltage profile change or while generating power management sequences.

Therefore, there is a need for a method and system for hybrid and/or distributed implementation of power profile management, and for generation/execution of instructions therefor. There is also a need for a hardware element (sequence controller) in a SoC and/or NoC that can be configured to generate and/or execute power profile management instructions using a hybrid combination of software and hardware, and further configured to run in parallel with other similar hardware elements to generate and execute power profile management instructions for different segments or regions of SoC/NoC.

SUMMARY

Aspects of the present disclosure relate to a method and system for hybrid and/or distributed implementation of generation and/or execution of power profile management instructions. An embodiment of the present disclosure provides a hardware element of a SoC/NoC that can be configured to generate and/or execute power profile management instructions using a hybrid combination of software and hardware, wherein the hardware element can be run in parallel with other hardware elements of the SoC to generate and execute power profile management instructions for different segments or regions of the SoC/NoC for efficient and safe working thereof.

Aspects of the present disclosure relate to a mixed hardware and software mechanism, wherein different partitions/regions (each region having one or more hardware elements) of a SoC can be switched from one state to another, and wherein the one or more hardware elements of one or more partitions/regions can have different power and frequency domains. In an aspect, the switching can be enabled to take place in a controlled manner, wherein the switching between regions and operations relating to such switching can be performed safely.

Aspects of the present disclosure further relate to a hardware element configured to evaluate dependence of one SoC region/part on another region so that switching between one or more hardware elements of one or more regions can be efficiently and carefully sequenced. In another aspect, the proposed disclosure relates to a combination of hardware and software based switching that allows performance of the switching operation that consumes less time, has fewer read/write cycle, is more robust, has lower/minimal chances of different regions/parts getting stuck in invalid state, is deadlock free, or minimizing out of order switching. In an aspect, state of a hardware element of SoC, in a non-limiting example, can include ON/OFF state of power, wherein more than two states can always be supported, wherein software component of the proposed switching controller architecture of the present disclosure allows controlled and programmable switching between states of one or more hardware elements. In another aspect, the proposed switching architecture allows a capability to sequence the change in steps/operations before the switching takes place to ensure smooth state switching action, wherein such as steps/operation can include, but are not limited to, ensuring that no pending transaction exists, set-reset settings are configured, clocks are set, and that the hardware elements that need to undergo switching are ready for power down/up, wherein such capability can be configured in a programmable manner through a finite state machine (FSM) that can be programmed to perform each of these steps/operations for each hardware element in a programmable manner. The proposed switching architecture can also have the capability to sequence and/or schedule power state switching steps across hardware elements based on predefined or dynamically supplied power profiles. The proposed switching architecture, implemented, say through a hardware element in SoC, can also be configured to save power state switching without any state loss, thereby preventing any data corruption. In yet another aspect, architecture of the present disclosure can have a capability to react to externally generated events without any loss of state or data, wherein a user can also abort the switching operation in case the state switching is not complete without any abrupt operation at the SoC as each element is aware of its current state, and interdependency between hardware elements is taken care of while aborting the operation. According to another embodiment, system/architecture of the present disclosure has the capability to chain individual FSM's/steps/operations within a hardware element and/or with other FSM's/steps/operation of other hardware elements. According to another embodiment, system/architecture of the present disclosure has the capability to override/skip individual power state switching steps using software sequences such that, if desired, one or more steps/operations of a hardware element can be overridden whenever a user desires an exception of such steps/operations for the element. In yet another aspect, system of the present disclosure enables a hierarchical and/or distributed implementation of switching operation through one or more hardware element(s) that are responsible for carrying out the switching operation, wherein instead of a single hardware element controlling the complete state switching/power profile operation/management, multiple hardware elements can be distributed hierarchically or say in a hub-spoke format to enable different responsibilities to be given to each hardware element. In an aspect, hardware elements responsible for controlling power profile management can be implemented based on programmable logic such as Programmable Gate Array (PGA). In yet another aspect, system of the present disclosure can have the capability to incorporate full and/or partial microcoded implementation for change in the steps/sequences of the FSMs/operations. Hardware elements responsible for power profile management can also have the capability to save and restore ROM state, wherein if power is switched off from the complete SoC, state of the SoC can be saved (by means of a checkpoint being created for one or more configured hardware elements to save the dump state of the element in a non-destructive memory configured by the user/system) and later restored when the power is back. In yet another aspect, one or more of the proposed hardware element for power profile management can be configured to manage state change involving voltage and frequency changes (by changing frequency of clocks used by the SoC hardware elements), for instance. In yet another aspect, FSM to change state of one or more hardware elements can be triggered using hardware and/or software, for instance based on signals that can be triggered based on hardware interrupts. In another aspect, system of the present disclosure can incorporate field reparable implementation of FSM using software, wherein the FSM's are not hardcoded and can therefore be updated through software to enable control of the sequence of operations being performed by the FSM and ensure that the proposed mechanisms make sure that the sequence and steps can be altered and/or debugged and/or updated on the actual silicon.

Aspects of the present disclosure are directed to a network/hardware element of a SoC that can be configured to generate and execute power profile management instructions for switching power profile(s) of one or more hardware elements using a hybrid combination of hardware and software level implementation, wherein generation and execution of power profile management instructions can be based on one or more of input specification, current status of one or more hardware elements, user specified changes (through change in programming in software), among other external inputs. In an example implementation, input specifications that can be used for generating and executing power profile management instructions can include System on Chip (SoC) design specification, Network on Chip (NoC) design specification, power specification comprising power domain assignment information, voltage domain assignment information, power profile information, traffic profile information, information about interdependency of components, traffic flow information, among other parameters. The one or more input specifications can include other information such as current capacity of each channel connecting one or more components, power state retention requirement, power constraints, bandwidth limitations, and inter component communication protocols.

Aspects of the present disclosure further provide a network/hardware element of a SoC or NoC that can be configured to dynamically receive power profile management instructions from one or more of a set of first hardware elements of the SoC and execute the received power profile management instructions for switching the power state of one or more of a set of second hardware elements of the SoC, wherein one or more of the set of first hardware elements can be higher level hardware element of the SoC, and one or more of the set of second hardware elements can be lower level hardware elements of the SoC.

In an embodiment, the set of first hardware elements can be configured to dynamically receive one or more input specifications, power profiles of one or more hardware elements, and one or more external inputs in order to generate one or more power profile management instructions and communicate the generated one or more power profile management instructions to one or more of the second hardware elements. Aspects of the present application also provide dynamic power profile management instructions for dynamically assigning power domain and voltage domain to the hardware elements of the SoC or NoC. Based on the given input, a hardware element of the present disclosure can determine one or more hardware elements/components that need to changes their power state (e.g. go ON/OFF) when the SoC switches from one power profile to another, or when any region(s) or particular hardware element(s) of SoC need to change their power profile. Example implementations of the present application include analysis of the input specification, and determination of interdependency of components/agent/hardware elements on chip, and generate power profile management instructions. Hardware elements configured to enable sequencing of power switching to take place can also be configured to determine one or more other hardware elements/component that can change their power state (switched ON/OFF) in parallel based on a given input specification when the SoC or a segment of SoC switches from one power profile to another.

In an example implementation, hardware elements configured to generate power profile management instructions can also be configured to consider retention requirement for providing functionality of save function (for saving the power state) and restore function for saving one or more states associated with one or more hardware/network elements/components/agents. In an example implementation one or more external inputs can be a user input, system generated interrupts, or abort instructions.

An aspect of the present disclosure provides a hardware element of SoC for dynamically generating and executing power profile management instructions for switching power profile of a hardware element or a set of hardware elements that are placed at the same level or at a higher level or at a lower level in the NoC or SoC when compared with the hardware element configured to control the switching operation.

In an example implementation power profile management instructions can be communicated using point to point signaling between hardware elements and network elements. In another example implementation power profile management instructions can be communicated through a set of register updates. In another example implementation power profile management instructions can be communicated through dedicated sideband signals.

In an example implementation, one or more hardware elements of a SoC or NoC can be configured to operate in parallel for switching power profiles of one or more hardware elements of different segments or partitions/regions, wherein parallel execution of power profile management sequences by one or more proposed hardware elements (also referred to as controllers for power profile management/switching operations) provides better speed and independent operation of hardware elements of different partitions/regions of a SoC or NoC.

According to an embodiment of the present disclosure, one or more proposed hardware elements and network elements can be implemented as programmable logic elements that can be configured to run one or more of a full micro-coded finite state machine (FSM) or a partial micro-coded finite state machine (FSM). According to another embodiment of the present disclosure, one or more proposed hardware elements for power profile management can be configured to run a field programmable finite state machine that can be programmed using one or more of software, fuses, and patch RAMs.

In an example implementation, the proposed hardware elements/network elements for power profile management can be power managers or switches or routers or register buses or bridges of SoC/NoC or a ring-master or any other level 1 network element or any other layer 2 network element of the SoC/NoC.

DETAILED DESCRIPTION

Figure 1A:
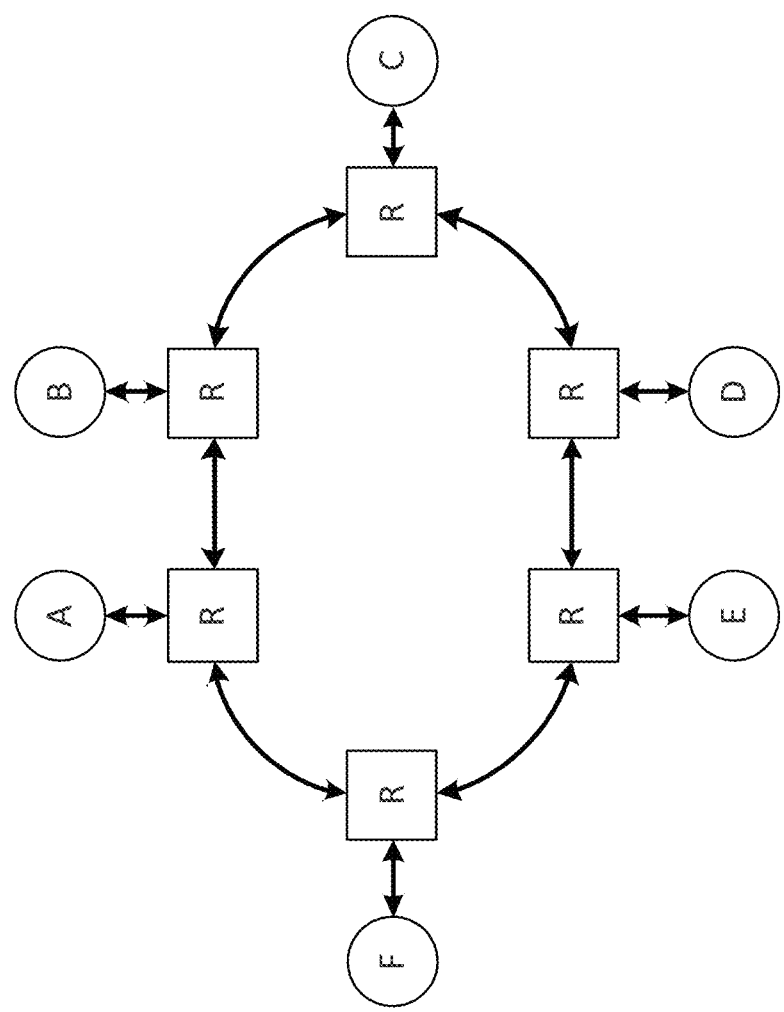
FIGS. 1(a), 1(b) 1(c) and 1(d) illustrate examples of Bidirectional ring, 2D Mesh, 2D Torus, and 3D Mesh NoC Topologies.
Figure 1B:
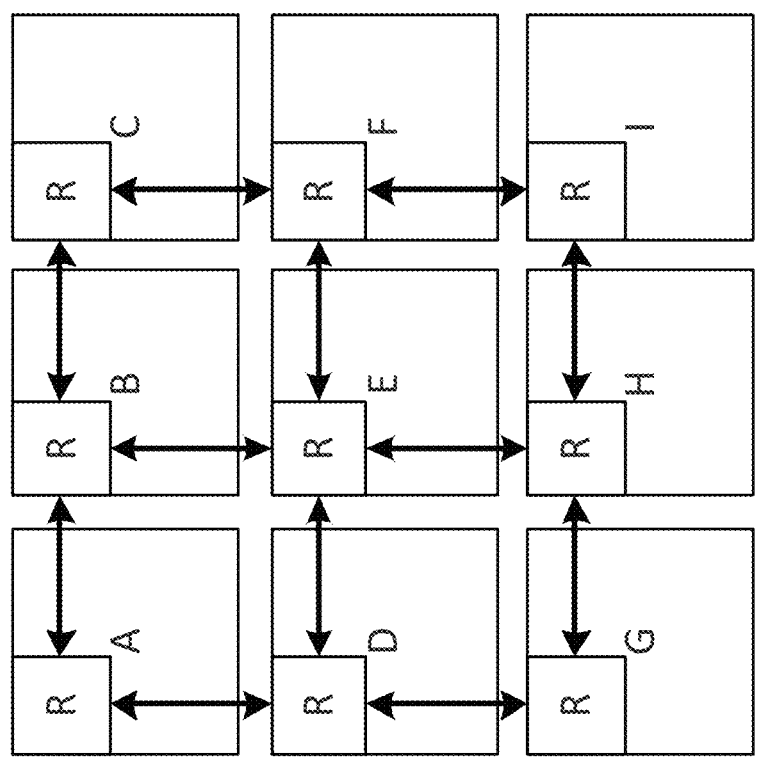
Figure 1C:
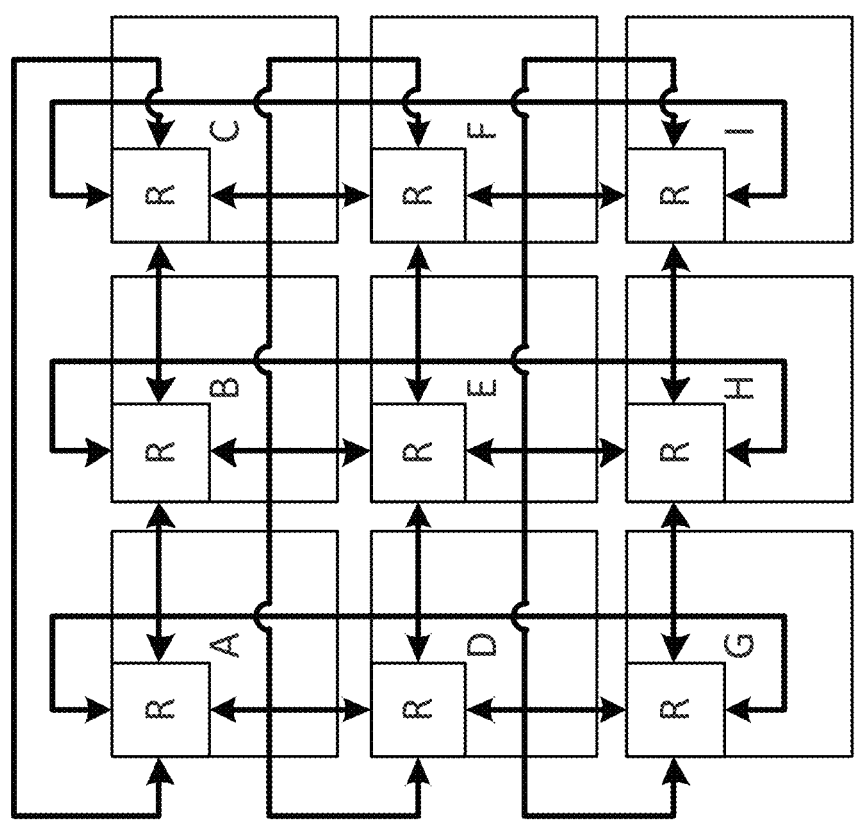
Figure 1D:
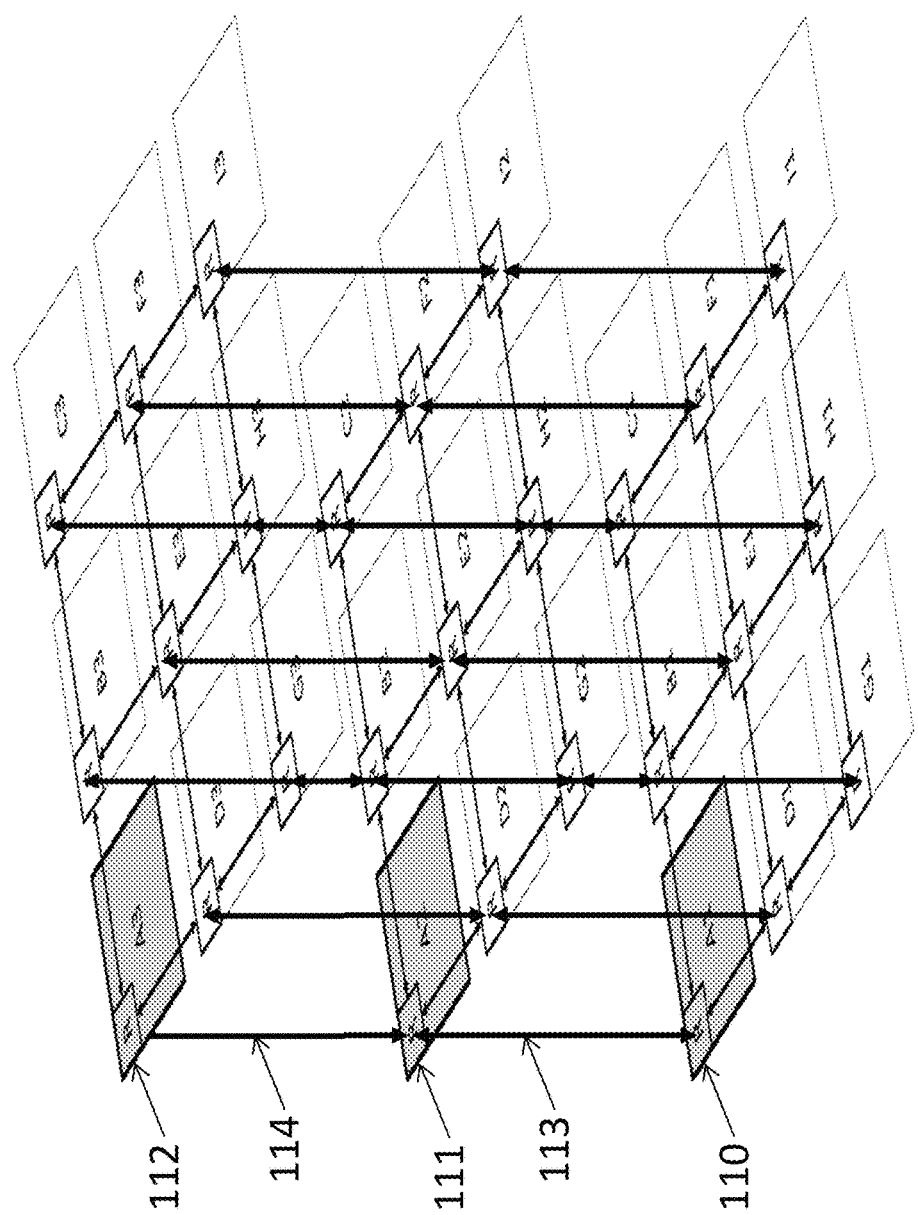
Figure 2A:
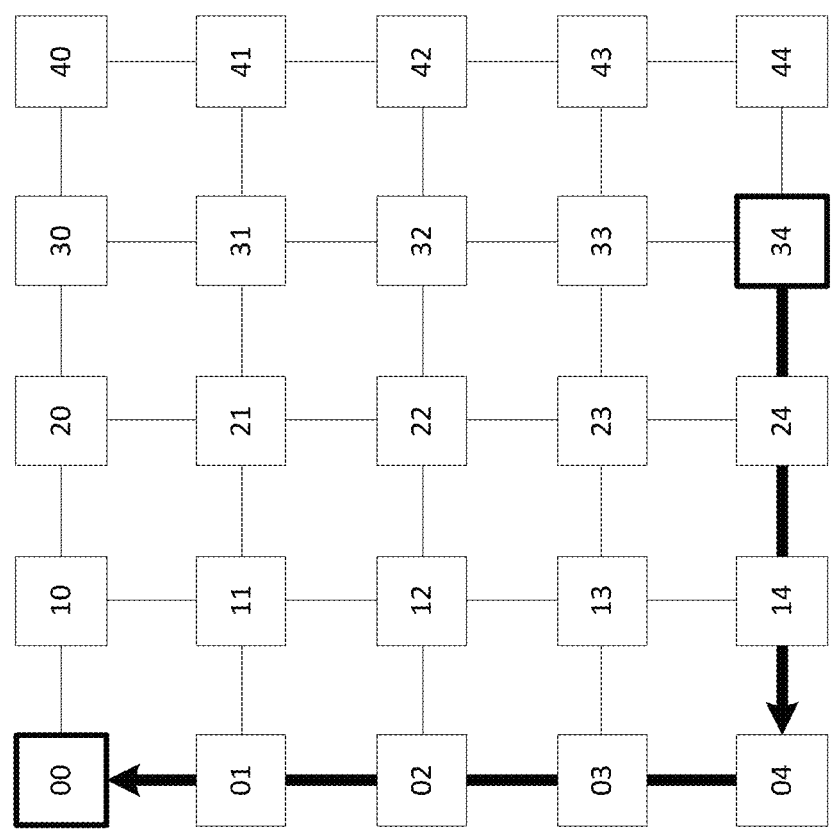
FIG. 2(a) illustrates an example of XY routing in a related art two dimensional mesh.
Figure 2B:
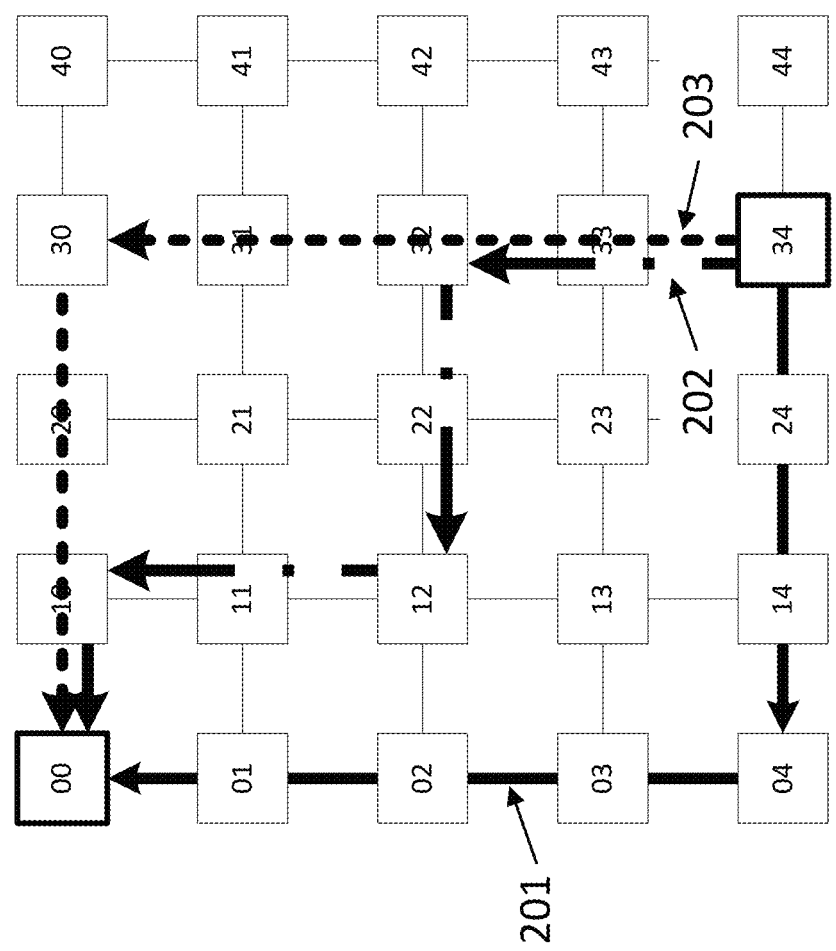
FIG. 2(b) illustrates three different routes between a source and destination nodes.
Figure 3A:
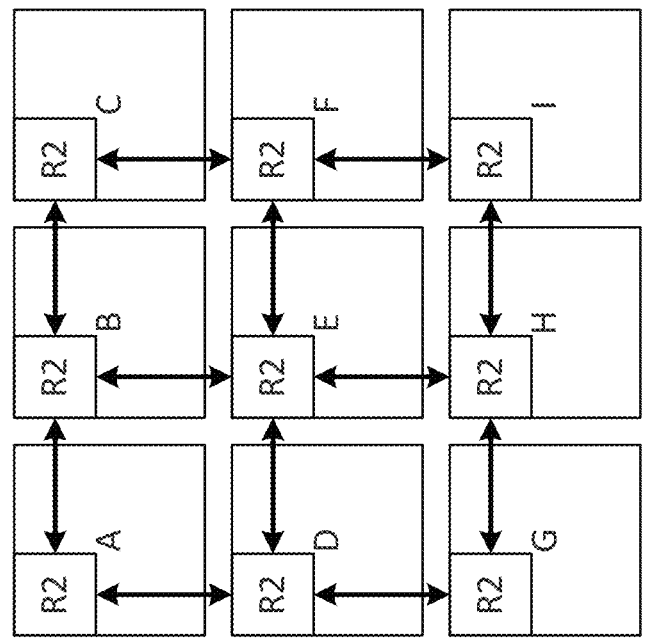
FIG. 3(a) illustrates an example of a related art two layer NoC interconnect.
Figure 3A:
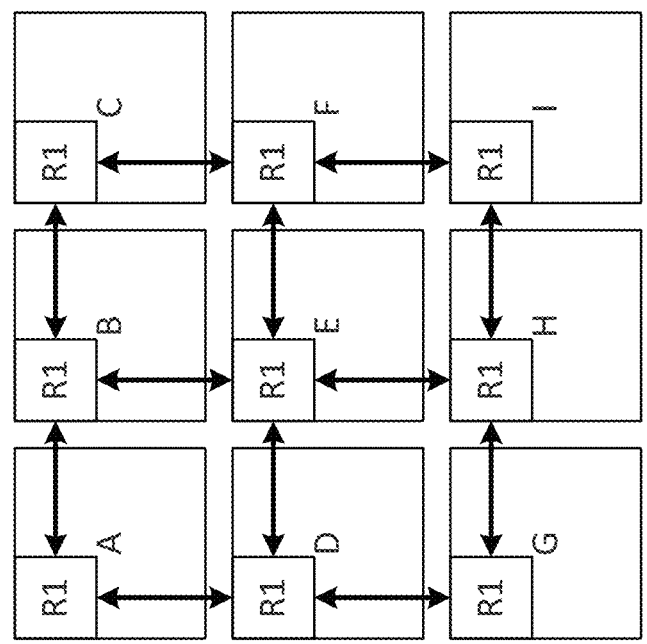
Figure 3B:
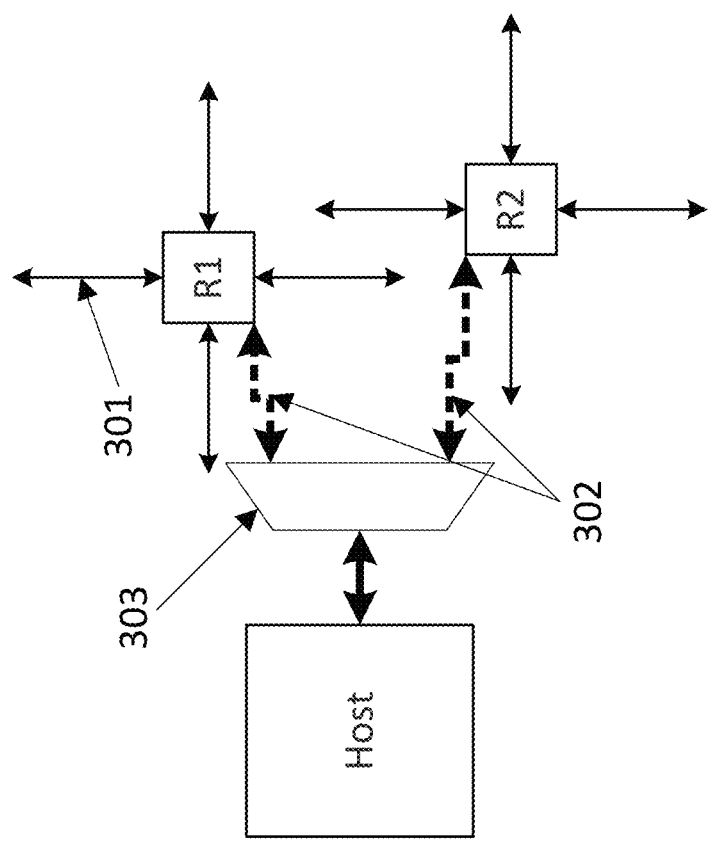
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, use of the term "automatic" may involve fully automatic or semi-automatic implementations involving user or administrator control over certain aspects of the implementation, depending on the desired implementation of one of ordinary skill in the art practicing implementations of the present application.

Aspects of the present disclosure relate to a method and system for hybrid and/or distributed implementation of generation and/or execution of power profile management instructions. An embodiment of the present disclosure provides a hardware element of a SoC/NoC that can be configured to generate and/or execute power profile management instructions using a hybrid combination of software and hardware, wherein the hardware element can be run in parallel with other hardware elements of the SoC to generate and execute power profile management instructions for different segments or regions of the SoC/NoC for efficient and safe working thereof.

Aspects of the present disclosure relate to a mixed hardware and software mechanism, wherein different partitions/regions (each region having one or more hardware elements) of a SoC can be switched from one state to another, and wherein the one or more hardware elements of one or more partitions/regions can have different power and frequency domains. In an aspect, the switching can be enabled to take place in a controlled manner, wherein the switching between regions and operations relating to such switching can be performed safely.

Aspects of the present disclosure further relate to a hardware element configured to evaluate dependence of one SoC region/part on another region so that switching between one or more hardware elements of one or more regions can be efficiently and carefully sequenced. In another aspect, the proposed disclosure relates to a combination of hardware and software based switching that allows better performance of the switching operation so that it consumes less time, has fewer read/write cycle, is more robust, has lower/minimal chances of different regions/parts getting stuck in invalid state, deadlock free, or minimizing out of order switching. In an aspect, state of a hardware element of SoC, in a non-limiting example, can include ON/OFF state of power, wherein more than two states can always be supported, wherein software component of the proposed switching controller architecture of the present disclosure allows controlled and programmable switching between states of one or more hardware elements. In another aspect, the proposed switching architecture allows a capability to sequence the change in steps/operations before the switching takes place to ensure smooth state switching action, wherein such as steps/operation can include, but are not limited to, ensuring that no pending transaction exists, set-reset settings are configured, clocks are set, and that the hardware elements that need to undergo switching are ready for power down/up, wherein such capability can be configured in a programmable manner through a finite state machine (FSM) that can be programmed to perform each of these steps/operations for each hardware element in a programmable manner. The proposed switching architecture can also have the capability to sequence and/or schedule power state switching steps across hardware elements based on predefined or dynamically supplied power profiles. The proposed switching architecture, implemented, say through a hardware element in SoC, can also be configured to save power state switching without any state loss, thereby preventing any data corruption. In yet another aspect, architecture of the present disclosure can have a capability to react to externally generated events without any loss of state or data, wherein a user can also abort the switching operation in case the state switching is not complete without any abrupt operation at the SoC as each element is aware of its current state, and interdependency between hardware elements is taken care of while aborting the operation. According to another embodiment, system/architecture of the present disclosure has the capability to chain individual FSM's/steps/operations within a hardware element and/or with other FSM's/steps/operation of other hardware elements. According to another embodiment, system/architecture of the present disclosure has the capability to override/skip individual power state switching steps using software sequences such that, if desired, one or more steps/operations of a hardware element can be overridden whenever a user desires an exception of such steps/operations for the element. In yet another aspect, system of the present disclosure enables a hierarchical and/or distributed implementation of switching operation through one or more hardware element(s) that are responsible for carrying out the switching operation, wherein instead of a single hardware element controlling the complete state switching/power profile operation/management, multiple hardware elements can be distributed hierarchically or say in a hub-spoke format to enable different responsibilities to be given to each hardware element. In an aspect, hardware elements responsible for controlling power profile management can be implemented based on programmable logic such as PGA. In yet another aspect, system of the present disclosure can have the capability to incorporate full and/or partial microcoded implementation for change in the steps/sequences of the FSMs/operations. Hardware elements responsible for power profile management can also have the capability to save and restore state, wherein if power is switched off from the complete SoC, state of the SoC can be saved (by means of a checkpoint being created for one or more configured hardware elements to save the state of the element in a non-destructive memory configured by the user/system) and later restored when the power is back. In yet another aspect, one or more of the proposed hardware elements for power profile management can be configured to manage state change involving voltage and frequency changes (by changing frequency of clocks used by the SoC hardware elements), for instance. In yet another aspect, FSM to change state of one or more hardware elements can be triggered using hardware and/or software, for instance based on signals that can be triggered based on hardware interrupts. In another aspect, system of the present disclosure can incorporate field reparable implementation of FSM using software, wherein the FSM's are not hardcoded and can therefore be updated through software to enable control of the sequence of operations being performed by the FSM and ensure that the proposed mechanisms make sure that the sequence and steps can be altered and/or debugged and/or updated on the actual silicon.

Aspects of the present disclosure are directed to a network/hardware element of a SoC that can be configured to generate and execute power profile management instructions for switching power profile(s) of one or more hardware elements using a hybrid combination of hardware and software level implementation, wherein generation and execution of power profile management instructions can be based on one or more of input specification, current status of one or more hardware elements, user specified changes (through change in programming in software), among other external inputs. In an example implementation, input specifications that can be used for generating and executing power profile management instructions can include System on Chip (SoC) design specification, Network on Chip (NoC) design specification, power specification comprising power domain assignment information, voltage domain assignment information, power profile information, traffic profile information, information about interdependency of components, traffic flow information, among other parameters. The one or more input specifications can include other information such as current capacity of each channel connecting one or more components, power state retention requirement, power constraints, bandwidth limitations, and inter component communication protocols etc.

Aspects of the present disclosure further provide a network/hardware element of a SoC or NoC that can be configured to dynamically receive power profile management instructions from one or more of a set of first hardware elements of the SoC and execute the received power profile management instructions for switching the power state of one or more of a set of second hardware elements of the SoC, wherein one or more of the set of first hardware elements can be higher level hardware element of the SoC, and one or more of the set of second hardware elements can be lower level hardware elements of the SoC.

In an embodiment, the set of first hardware elements can be configured to dynamically receive one or more input specifications, power profiles of one or more hardware elements, and one or more external inputs in order to generate one or more power profile management instructions and communicate the generated one or more power profile management instructions to one or more of the second hardware elements. Aspects of the present application also provide dynamic power profile management instructions for dynamically assigning power domain and voltage domain to the hardware elements of the SoC or NoC. Based on the given input, a hardware element of the present disclosure can determine one or more hardware elements/components that need to changes their power state (e.g. go ON/OFF) when the SoC switches from one power profile to another, or when any region(s) or particular hardware element(s) of SoC need to change their power profile. Example implementations of the present application include analysis of the input specification, and determination of interdependency of components/agent/hardware elements on chip, and generate power profile management instructions. Hardware elements configured to enable sequencing of power switching to take place can also be configured to determine one or more other hardware elements/component that can change their power state in parallel based on a given input specification when the SoC or a segment of SoC switches from one power profile to another.

In an example implementation, hardware elements configured to generate power profile management instructions can also be configured to consider retention requirement for providing functionality of save function (for saving the power state) and restore function for saving one or more states associated with one or more hardware/network elements/components/agents. In an example implementation one or more external inputs can be a user input, system generated interrupts, or abort instructions amongst others.

An aspect of the present disclosure provides a hardware element of SoC for dynamically generating and executing power profile management instructions for switching power profile of a hardware element or a set of hardware elements that are placed at the same level or at a higher level or at a lower level in the NoC or SoC when compared with the hardware element configured to control the switching operation.

In an example implementation power profile management instructions can be communicated using point to point signaling between hardware elements and network elements. In another example implementation power profile management instructions can be communicated through a set of register updates. In another example implementation power profile management instructions can be communicated through dedicated sideband signals.

In an example implementation, one or more hardware elements of a SoC or NoC can be configured to operate in parallel for switching power profiles of one or more hardware elements of different segments or partitions/regions, wherein parallel execution of power profile management sequences by one or more proposed hardware elements (also referred to as controllers for power profile management/switching operations) provides better speed and independent operation of hardware elements of different partitions/regions of a SoC or NoC.

According to an embodiment of the present disclosure, one or more proposed hardware elements and network elements can be implemented as programmable logic elements that can be configured to run one or more of a full micro-coded finite state machine (FSM) or a partial micro-coded finite state machine (FSM). According to another embodiment of the present disclosure, one or more proposed hardware elements for power profile management can be configured to run a field programmable finite state machine that can be programmed using one or more of software, fuses, and patch RAMs.

In an example implementation, the proposed hardware elements/network elements for power profile management can be power managers or switches or routers or register buses or bridges of SoC/NoC or a ring-master or any other level 1 network element or any other level 2 network element of the SoC/NoC.

Figure 4A:
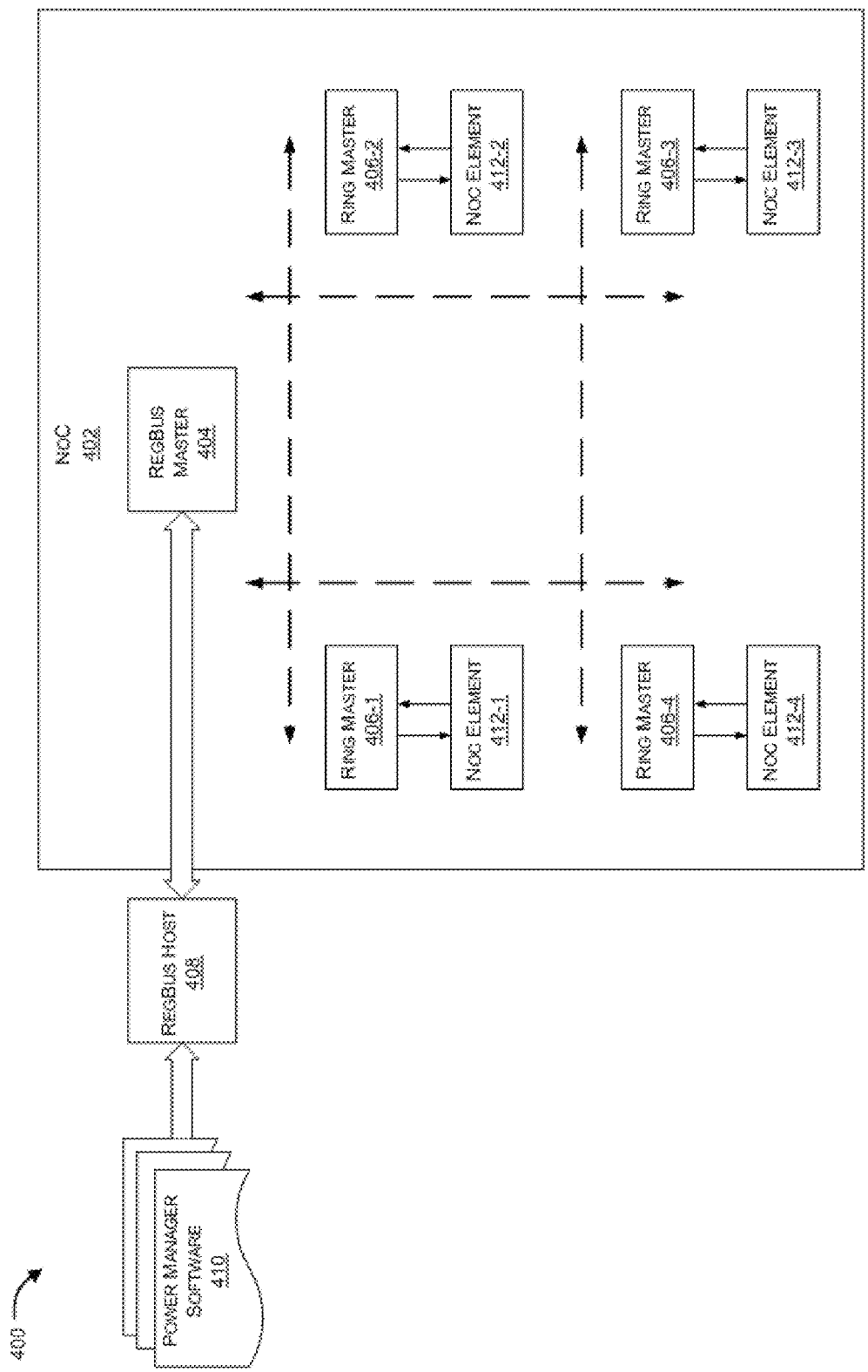
FIGS. 4(a) and 4(b) illustrate a block diagram of NoC for low power profile switching that use the method of present disclosure for generating and executing power profile management instructions in accordance with an embodiment of the present disclosure.
Figure 4B:
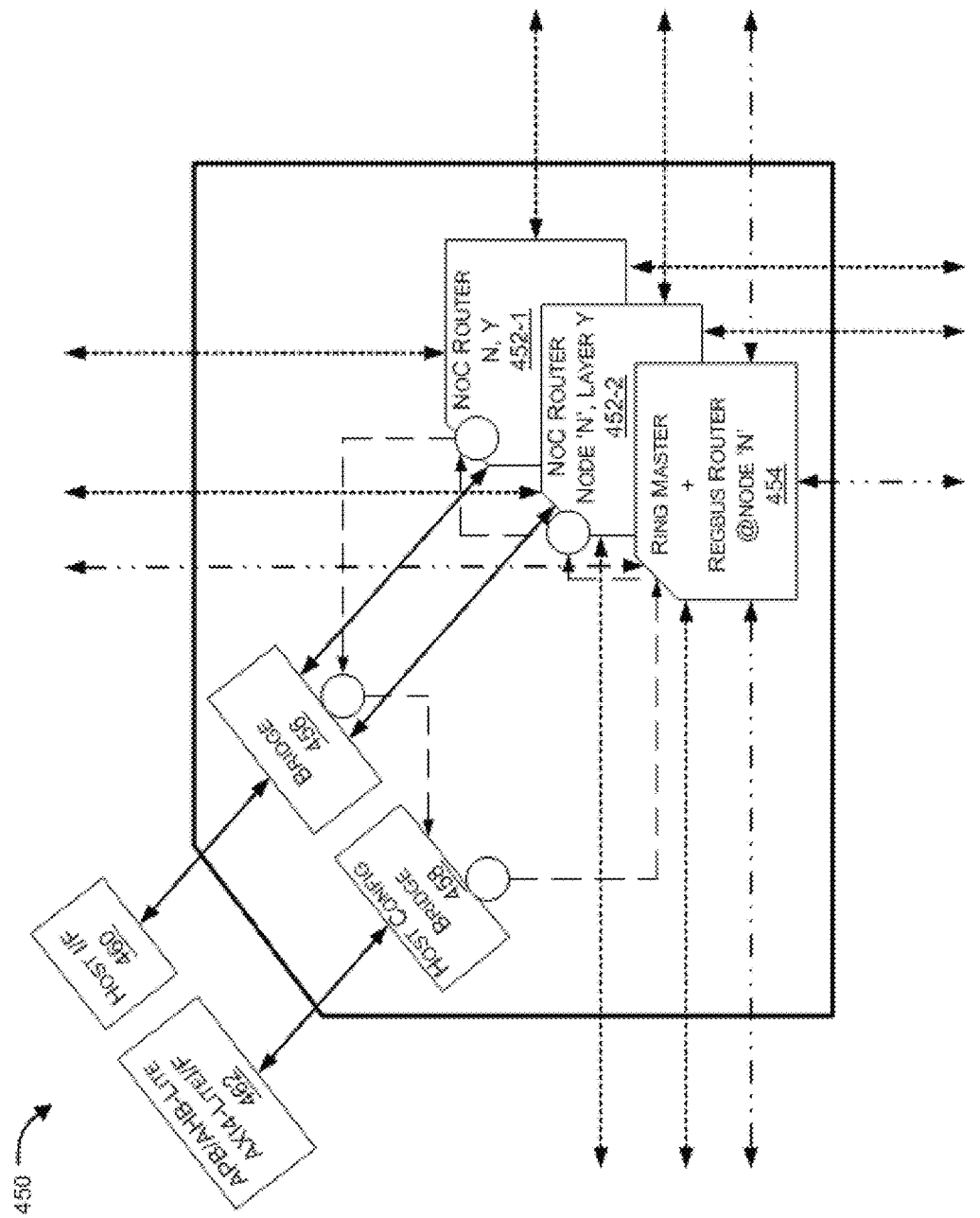

FIGS. 4(a) and 4(b) illustrate an example block diagram of NoC for low power profile switching that use the architecture of the present disclosure for generating and executing power profile management instructions in accordance with an embodiment of the present disclosure. As mentioned, architecture of the present disclosure can allow a first portion of the switching operation to be controlled through hardware, and a second portion to be controlled through software by the end user, wherein sequences and synchronization between hardware elements need not be hardcoded and can be updated through techniques such as distributed switching control by having hardware elements being distributed across the NoC and not centralized, wherein such hardware elements (also interchangeably referred to as controllers) control switching of regions and SoC hardware elements contained therein.

As shown in the FIG. 4(a), a NoC 402 can be virtually divided in regions where each region can have a network element configured to act as a ring master, such as ring master 406-1, ring master 406-2, ring master 406-3 and ring master 406-4, collectively referred to as ring master 406 hereinafter, that can poll the current power status/profile of one or more hardware elements such as NoC element 412-1, NoC element 412-2, NoC element 412-3 and NoC element 412-4, collectively referred to as NoC element 412 hereinafter, that coupled with it, and provide power profile management instructions to the one or more NoC elements 412. In an example implementation, ring master 406 can be configured to generate power profile management instructions for switching one or more NoC elements 412 from one power state to another based on current power state of one or more NoC elements 412, wherein the instructions can be received by the ring master 406 from a register bus master 404 or can be received from register bus host 408, or can be received from power manager 410, or any other external input. In another example implementation, ring master 406 can be configured to receive power management instructions from a higher level network element, such as register bus master 404, register bus host 408, or power manager 410.

In an embodiment, ring master 406 can be configured to dynamically receive power profile management instructions from hardware elements of the SoC such as register bus master 404, register bus host 408, or power manager 410, and execute the received power profile management instructions for switching power state of elements such as NoC elements 412.

In an example implementation, register bus host 408 can be an external agent or CPU or cluster on which method of the present disclosure for generation and execution of power management instructions can be executed. Register bus host 408 can have a hardware level implementation for polling and switching power state of one or more other hardware elements such as NoC elements 412, ring master 406 or register bus master 406. In an example implementation, power manger 410 can be configured to poll the power status of one or more NoC elements 412 with the help of ring master 406 and register bus host 408, generate power profile management instructions and communicate the power profile management instructions to one or more NoC elements 412 through ring master 406 and register bus host 408 for switching power profile/status of one or more NoC elements 412 so as to change the power status of higher level network/hardware elements.

In an example implementation, one or more ring masters 406 can be configured to operate in parallel for switching power profile of one or more NoC elements 412 of their assigned segments. For example ring master 406-1, ring master 406-2, ring master 406-3 and ring master 406-4 can work in parallel to change the power status/profile of NoC element 412-1, NoC element 412-2, NoC elements 412-3 and NoC elements 412-4 respectively. The parallel execution of power profile management instructions by one or more network elements provides better speed and independent operation of hardware elements of different sectors/region of a SoC or NoC.

According to an embodiment of the present disclosure, ring master 406, register bus host 408, and NoC elements 412 can be a programmable logic element that can be configured to run a full micro-coded finite state machine or a partial micro-code finite state machine. According to another embodiment of the present disclosure, ring master 404, register bus host 408 and NoC elements 412 can be a programmable logic element that can be configured to run a field programmable finite state machine (FSM). The ring master 406, register bus host 408 and NoC elements 412 can be dynamically programmed using one or more of software, fuses and patch RAMs to implement a FSM.

In an example implementation, register bus master 404 can have level-2 control hardware for switching the power state of layer-1 network elements such as ring master 406, and layer-0 network elements, such as NoC elements 412. Similarly, ring master 406 can have control hardware for switching the power state of layer-0 network elements, such as NoC elements 412. The register bus master 404 can have dedicated control hardware for each NoC elements 412 attached with it, or single common control hardware for all the NoC elements 412 attached with it. In another example implementation, the ring master 406 can be configured to use FSM to control the power state change of one or more NoC elements 412 attached with it.

According to one embodiment, low-power state switching system shown in 400 can include a hardware implemented inside the NoC 402 and corresponding power management software/firmware that runs on the power manager 410. Register bus host 408 can be an external agent CPU/Cluster on which power management software can be executed, wherein the software can be configured to control power state switching of the NoC elements, and wherein the software can recognize a defined set of stable power states known as power profiles and provide an abstraction layer of higher level software to control state switching. The power management software can be aware of individual NoC elements and programming sequence required for going to a desired power profile. Master 404, on the other hand, can be configured as a NoC element where Level-2 control (L2-FSM) hardware can reside. Ring master 406, on the other hand, can be a NoC element where power state control hardware for each NoC element resides and can include a dedicated Level-1 control (L1-FSM) hardware per element.

FIG. 4(b) illustrates an exemplary representation 450 showing connection flow between one or more NoC routers 452-1/452-2 and a network element such as a bridge 456, wherein the bridge 456 can be configured to receive instructions from host interface 460 and change the state of the NoC element such as 452. The architecture can further include a ring master such 454 that can control the switching operation based on the host configuration 458 of bridge.

Figure 5:
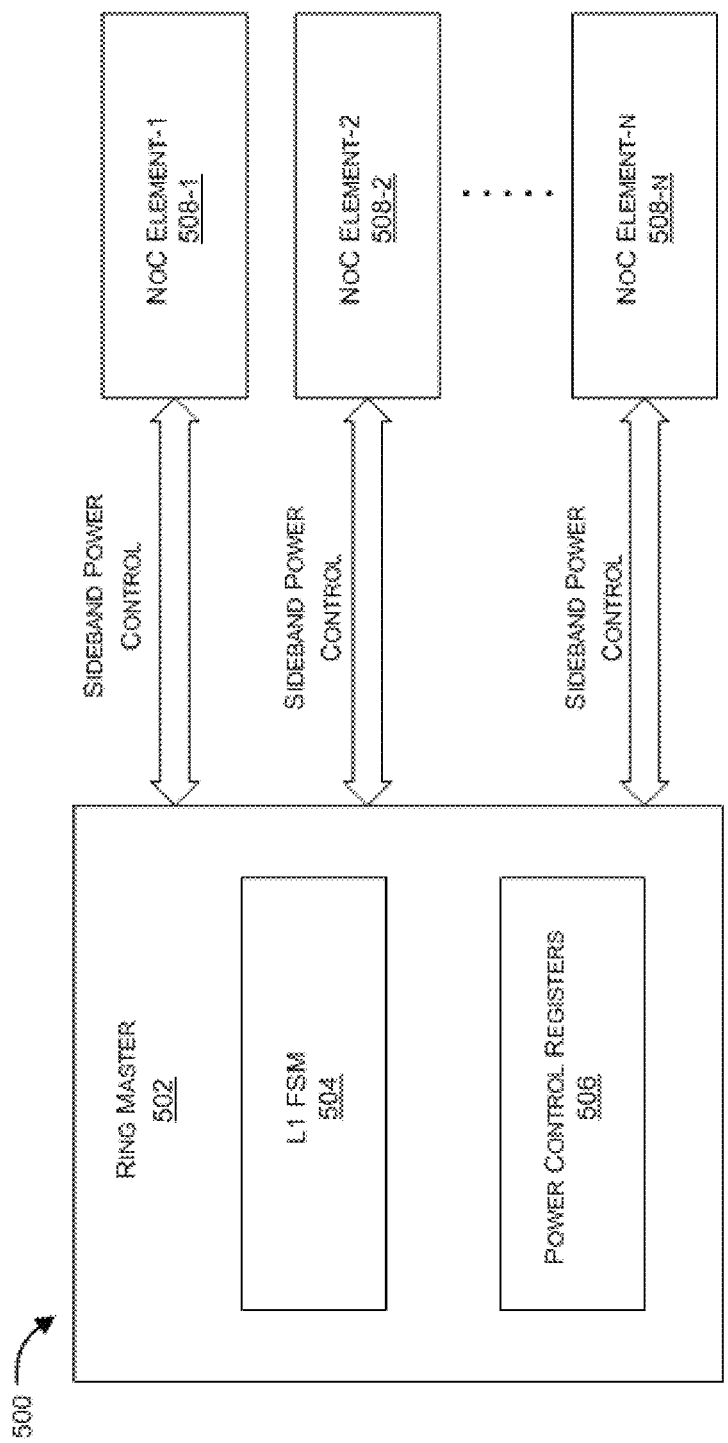
FIG. 5 illustrates an example ring master that control switching of NoC elements in accordance with an embodiment of the present disclosure.

FIG. 5 illustrates an example ring master that controls switching of NoC elements in accordance with an embodiment of the present disclosure. As shown in FIG. 5, ring master 502 can be configured to poll the power status of one or more NoC elements such as NoC element 508-1, NoC element 508-2 and NoC element 508-N, collectively and interchangeably referred to as NoC elements 508. The ring master 502 can also be configured to execute power management instructions received by higher layer network elements such as register bus master, register bus host or a power manager, for changing power status of one or more NoC elements 508 attached with it. Ring master 502 and NoC elements can use sideband signaling for polling the power status and communicating the power profile management instructions. In an example implementation, the ring master 502 can have level 1 FSM 504 running over it to control power state of NoC elements 508 attached with ring master 502.

In another example implementation, ring master 502 can also have a power control register 506 that controls power states of one or more NoC elements 508 attached to it. Level-1 FSM 504 and power control register 506 used in combination provides a hybrid implementation of power profile management instructions, which results in a more dynamic NoC. A typical NoC element 508 needs to follow a series of steps when it has to go from one power profile to another. In an example implementation, NoC elements can be configured to receive power profile management instruction, also referred here interchangeably as control instructions from power control registers 506 implemented by ring master 502. The hybrid combination of hardware and software by ring master provides efficient and safe working of SoC/NoC when one or more of NoC elements 508 switches from one power profile to another power profile.

In another example implementation, when the ring master 502 receives a request for power profile change of one or more NoC elements 508, it can generate power profile management instructions based on currently polled status of NoC elements 508 and execute the same. In another example implementation, ring master 502 can use a pre-defined time programmed instructions available in the power control registers 506 for changing power profile of one or more NoC elements. In an aspect, power profile management instructions can include step-by-step commands to be executed by the ring master 502 and associated NoC element(s) 508.

Since operation of these power control registers 506 can become expensive in terms of time taken to perform them, in an example implementation, each ring master 502 can implement a L1 FSM that can execute power profile management instructions. In an example implementation, software programmable L1 FSM 504 can execute power profile management instructions and can switch ON/OFF the NoC elements and then poll its status to provide the current power profile/status of the NoC element to the ring master. L1 FSM 504 based on the programming can perform individual steps required to switch power state of the NoC element 508. Execution of power profile management instruction by L1 FSM 504 can reduce the number of register read/write operations by the ring master 502.

According to one embodiment, each NoC element can be required to follow pre-defined steps to switch power state, wherein control for each step can come from registers implemented in the ring master. NoC element can send back a set of status bits for each step, which status bits can be accessed by the configured/implemented software through ring master register. These set of power control signals to enable switching of power states can be sent as side-band signals between the ringmaster and NoC element.

Figure 6A:
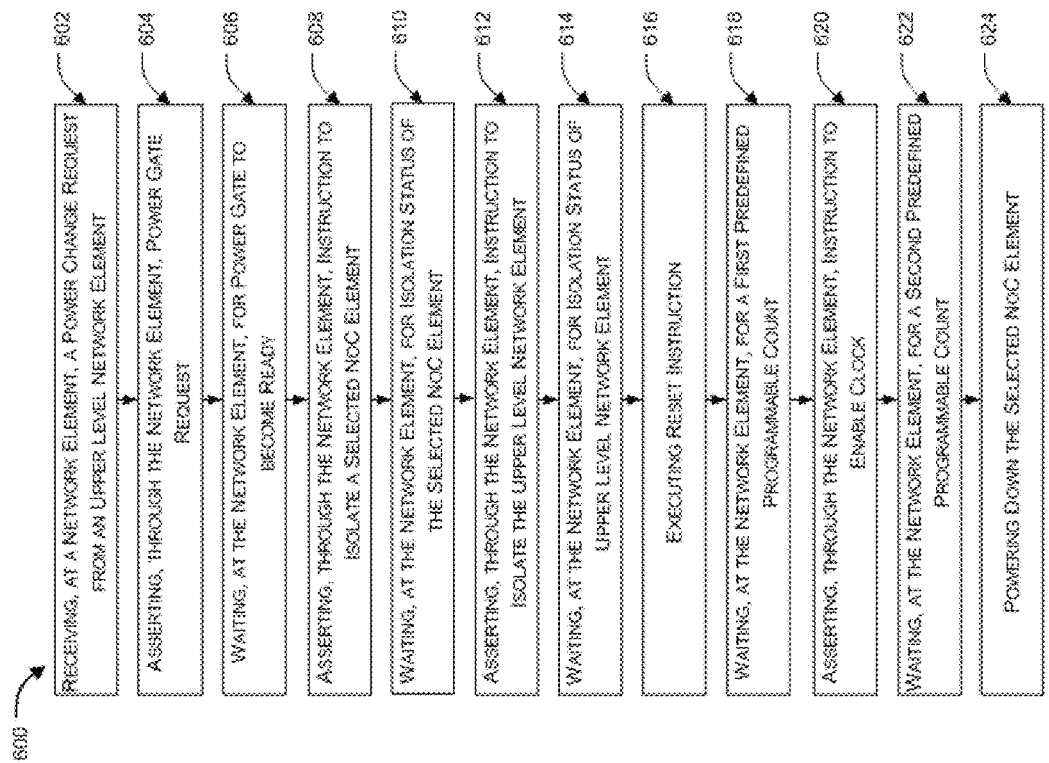
FIG. 6A illustrates an example power profile management instructions for switching a NoC element in power down state in accordance with an embodiment of the present disclosure.

FIG. 6(a) illustrates an example flow diagram having steps for finite state machine (FSM) power gate operation implemented for switching a NoC element to power down state in accordance with an embodiment of the present disclosure. In an embodiment, a finite state machine power gate operation of the present example can be implemented over a ring master and/or a network element/hardware element. As shown in the FIG. 6(a), a ring master and/or a network element can receive an instruction from an upper level network element for changing the power profile of a NoC element to a power disabled state. At step 602, a network element and/or ring master, for example, can receive a power state change request from an upper level network element such as a power manager, a register bus host, a register bus master, a switch or a router of NoC to change the status of a NoC element to power disabled state. In example implementation, the received power profile change request can be an interrupt or a user instruction. As shown at step 604, after receiving the power profile change request, the network element can assert a power gate request to make a NoC element in power down state, wherein asserting the power gate request can include execution of one or more power profile management instructions. As step 606, the network element can wait for a power gate to become ready. When the power gate is ready, the network element can assert instructions to enable isolation of the selected NoC element as shown at step 608 so as to ensure that the other NoC elements are not affected. At step 610, the network element (hardware element responsible for controlling the switching operation) can wait for isolation enabled status of the NoC element. At step 612, the network element can assert instructions for isolation of upper layer network elements such as a register bus. One reason for isolating the upper layer network elements such as a register can be to ensure that the network element doesn't receive overriding commands and/or instructions during its operation. As shown at step 614, the network element can wait to receive the isolation status of the register bus/upper network element(s). After receiving the isolation status of register bus, the network element can assert a reset command/instruction as shown at step 616 and wait for programmable count to finish as shown at step 618 before executing next instruction(s). At 620, the network element can de-assert the instruction and enable the clock and again wait for a programmable count as shown at step 622 to ensure that the clock is enabled. Upon completion of the programmable count, the NoC element can be powered down as shown at step 624.

Execution sequences of these instructions are merely for illustration and need not to be performed in the exact order in which they are present in above-disclosed example and may not even be comprehensive. One or more steps can be avoided. One can appreciate that the network element can similarly change the power state of NoC element to switch it in power enabled state using finite state machine power gate operation in accordance with an embodiment of the present disclosure. All such combinations and/or embodiments and/or change in configuration/construction is therefore completely within the scope of the present disclosure.

Figure 6B:
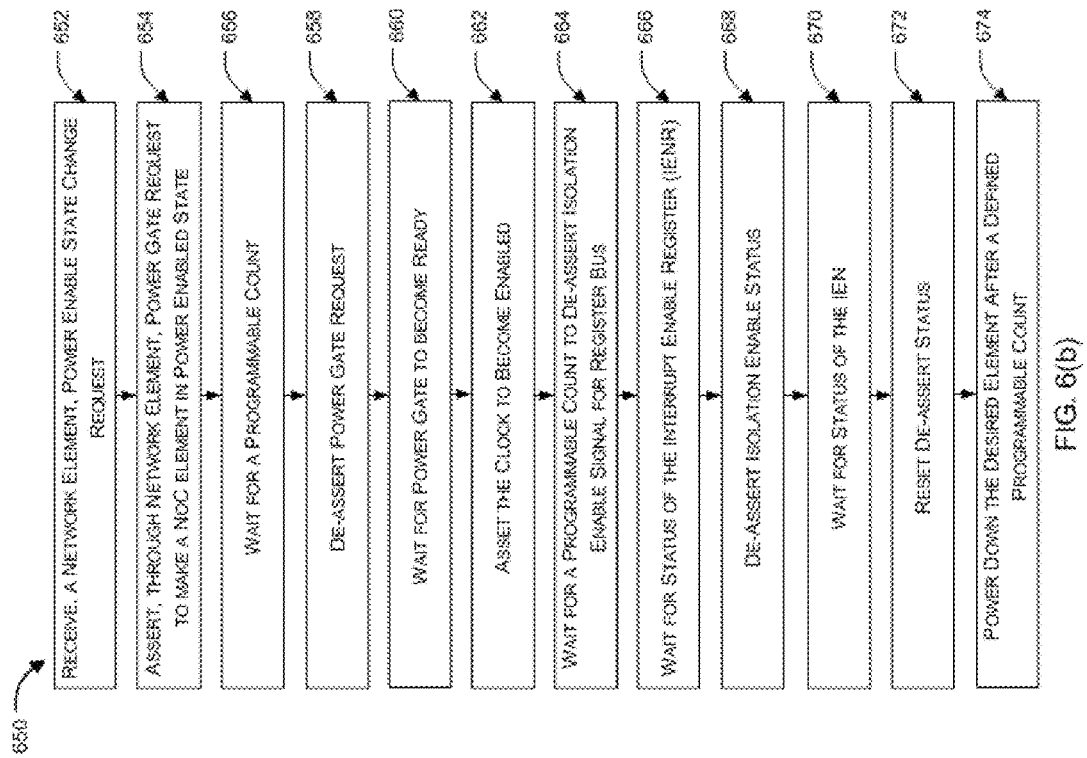
FIG. 6B illustrates an example power profile management instructions for switching a NoC element in power enable state in accordance with an embodiment of the present disclosure.

FIG. 6(*b*) illustrates an example flow diagram having steps for finite state machine (FSM) power gate operation implemented for switching a NoC element to power up/enabled state in accordance with an embodiment of the present disclosure. In an embodiment, a finite state machine power gate operation of the present example can be implemented over a ring master and/or a network element/hardware element. As shown in the FIG. 6(*b*), a ring master and/or a network element can receive an instruction from an upper level network element for changing the power profile of a NoC element to a power enabled state. At step 652, a network element and/or ring master, for example, can receive a power enable state change request from an upper level network element such as a power manager, a register bus host, a register bus master, a switch or a router of NoC to change the status of a NoC element to power disabled state. In example implementation, the received power profile change request can be an interrupt or a user instruction. As shown at step 654, after receiving the power profile change request, the network element can assert a power gate request to make a NoC element in power enabled state, wherein asserting the power gate request can include execution of one or more power profile management instructions. As step 656, the network element can wait for a programmable count, and then at 658 can de-assert power gate request. At 660, the network element can wait for the power gate to become ready, and then at 662, asset the Clock CLK to become enabled. At 664, the network element can again wait for a defined programmable count to de-assert the isolation enable signal for the register bus. At 666, the network element can wait for status of the Interrupt Enable Register (IENR), based on which, at 668, isolation enable status can be de-asserted, and at 670, the network element can wait for the status of the IEN, and at 672, the de-assert status can be reset to finally power down the desired element, at 674, after a defined programmable count.

Figure 7:
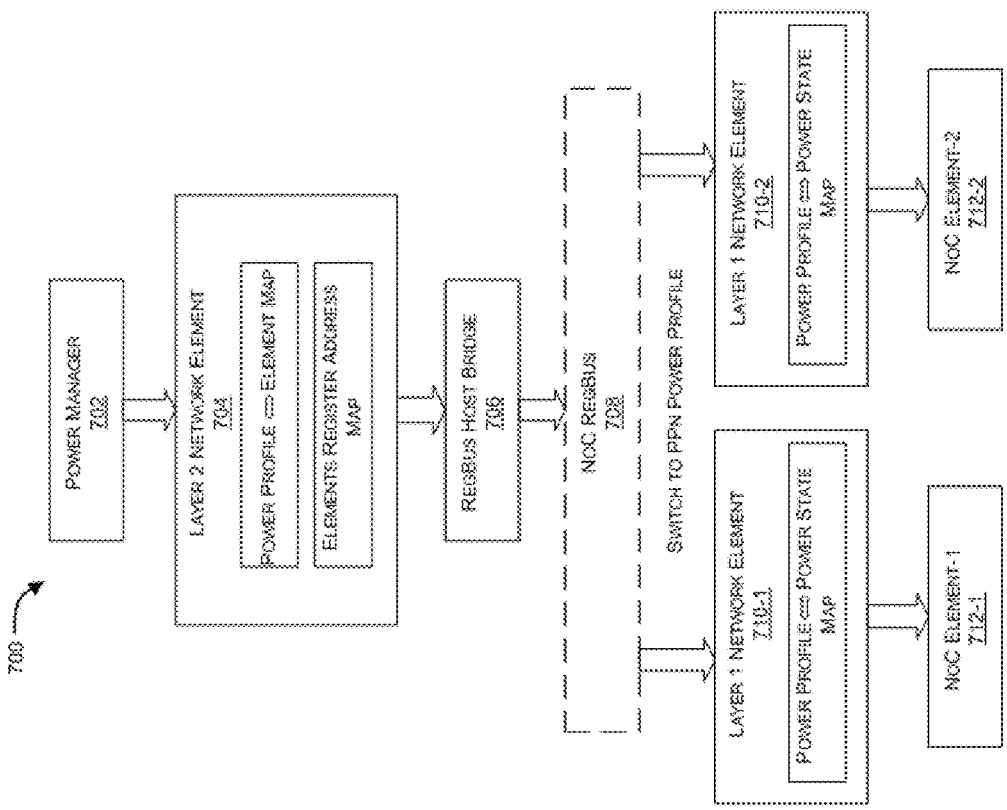
FIG. 7 illustrates an example instruction flow in hierarchal manner from a power manager to NoC elements using intermediate network elements in accordance with an embodiment of the present disclosure.

FIG. 7 illustrates an example instruction flow in hierarchal manner from a power manager to NoC elements using intermediate network elements in accordance with an embodiment of the present disclosure. As shown in FIG. 7, a power manger 702 of NoC or SoC can issue a command or power profile management instructions to NoC elements 712-1 and NoC element 712-2 through a series of intermediate network elements such a layer-2 network element 704, register bus host bridge 706, NoC register bus layer 708 and layer-1 network element 710. In an example implementation, a power manger 702, upon receiving a power profile change request, can poll the current power profile/status of every NoC element 712 and all other intermediate network elements such as layer-2 network element 704, register bus host bridge 706, NoC register bus layer 708, and layer-1 network element(s) 710. In an example implementation, the power manager 702 can receive power profile of the entire NoC as an input specification indicating the current status of individual network elements and NoC elements with the power profile change request.

In an embodiment, power manager 702 can generate power profile management instructions based on one or more input specifications and/or current status of one or more hardware elements. In an example implementation, the input specifications used for generating and executing power profile management instructions and can include System on Chip (SoC) design specification, Network on Chip (NoC) design specification, power specification comprising power domain assignment information, voltage domain assignment information and power profile information, traffic profile information, information about interdependency of components, traffic flow information among other parameters. The one or more input specifications may include other information such as current capacity of each channel connecting one or more components, power state retention requirement, power constraints, bandwidth limitations, and inter component communication protocols.

In an aspect, generated power profile management instructions can be executed by intermediate network elements, and NoC elements 712 of SoC or NoC so as to change from one power profile to another. In an example implementation, power profile of entire SoC or NoC or a region of SoC/NoC can be changed. In another example implementation, power profile of few selected network elements or NoC elements 712 can be changed.

In example implementation, intermediate network elements can use a hybrid combination of hardware and software for executing the power management sequence generated by the power manger 702. An embodiment of the present disclosure provides an intermediate network element of a SoC or NoC that can be configured to dynamically receive power profile management instructions from higher layer network elements such as a power manger, and execute the received power profile management instruction for switching the power state of one or more of second hardware elements of the SoC using hybrid combination of software and hardware.

In an embodiment, power manager 702 can be configured to dynamically receive one or more input specifications, power profiles of one or more network/NoC elements, and one or more external inputs, generate one or more power profile management instructions for power profile switching of one or more hardware elements based on the received input specifications, power profile of one or more hardware elements, and external input(s). Power manager 702 can be further configured to communicate generated power profile management instructions to one or more NoC elements through intermediate network elements. Aspects of the present application also provide dynamic power profile management instructions for dynamically assigning the power domain and voltage domain to the network elements of the SoC or NoC.

Based on the given input, power manager 702 can be configured to determine one or more elements/components that need to change their power state (e.g. go ON/OFF) when the SoC, or one or more regions of SoC, switch from one power profile to another. Power manager 702 can be configured to analyze input specifications and determine interdependency of components/agent/network elements on chip and generate power profile management instructions accordingly so as to avoid unwanted data loss, state loss or disruption to other NoC elements.

In an example implementation, power manager 702 can be configured to determine one or more network elements/components that can change their power state(s) (e.g. switched ON/OFF) in parallel based on a given input specification when the SoC switches from one power profile to another. In an example implementation, the power manager 702 can send power profile management instructions to an intermediate network element such as a layer-1 network element 710-1 and layer-1 network element 710-2 that can work in parallel to change the power profile of NoC element 712-1 and NoC element 712-2 respectively. In an example implementation, power manager 702 can use different intermediate network element(s) to control power status of different regions of segment of the SoC/NoC, wherein each intermediate network element can receive power profile management instructions from power manger 702 can execute them in parallel.

In an embodiment, the intermediate network elements are also configured to generate or edit power profile management instructions based on, for instance, interrupts, user inputs, or current status of one or more NoC elements.

In an example implementation, the power manager 702 can be configured to consider retention requirement for providing functionality for save function (for saving the power state) and restore function for one or more states associated with one or more hardware/network elements/components/agents. In an example implementation, one or more external inputs can be a user input, a system generated interrupts, or an abort instruction.

In an example implementation, power profile management instructions can be communicated using point-to-point signaling between hardware elements and network elements. In another example implementation, power profile management instructions can be communicated through a set of register updates. In another example implementation, power profile management instructions can be communicated through dedicated sideband signals.

A network element can use a fully coded finite state machine to receive one or more power profile instructions, and execute it using software programmable logic so as to change the power profile of connected NoC elements. According to an embodiment of the present disclosure, program manager 702 and/or layer-2 network element 704 and/or layer-1 network element 710 and/or ring master host bridge 706 can be a programmable logic element that can be configured to use a full micro-coded finite state machine or a partial micro-code finite state machine. According to another embodiment of the present disclosure program manager 702 and/or layer-2 network element 704 and/or layer-1 network element 710 and/or ring master host bridge 706 can be a programmable logic element that can be configured to use a field programmable finite state machine. In an example implementation, finite state machine of program manager 702 and/or L2 layer network element 704 and/or layer-1 network element 710 and/or ring master host bridge 706 can be programmed using software path, fuses or using patch RAMs.

In example implementation, level-2 power control can be implemented in a distributed manner where a part of the hardware resides on the register bus master or on the register bus host bridge 706, and the other part of the hardware resides on individual level-1 network element such as a ring master, which is responsible for controlling NoC elements. In an example implementation, level 2 network element 704 can communicate with level 1 network element 708, or with register bus host bridge 706 over a NoC register bus 708, and with dedicated sideband signals sending power profile management instructions and polling the power profile status.

According to one embodiment, Level-2 power control hardware can be implemented in a distributed manner, where parts of hardware can reside in the RegbusMaster/Tunnel and other parts can be distributed over individual ring masters. L2 FSM can be configured to communicate with L1 FSM's over regbus layer and couple of dedicated sideband signals for commit command and status polling. According to another embodiment, L2-FSM can provide an abstraction layer for power management software, wherein symbolic names can be configured for Power Profiles so that implementation specific details of individual NoC element sets is hidden from the software. The proposed architecture also provides a fixed programming model. In an aspect, addresses accessed for power state switching are fixed, unlike addresses of registers implemented in ring-master, which can change based on topology of NoC. Aspects of the present disclosure further provide defined sub-routines that take care of individual register accesses. Simpler polling schemes (aggregation of status bits) for status of state switch can also be configured to enable gracefully handling of abort/exception requests from the software. Aspects of the present disclosure are further configured to free up the software from sequencing state switches across elements and L1 FSM. Aspects of the present disclosure can provide debug interface to the software for debugging distributed state. Aspects of the present disclosure also provide performance improvements for state switching by configuration of side-band (Up-Stream/Down-Stream) for commands/state poll, and transparent handling of slave demap.

Figure 8A:
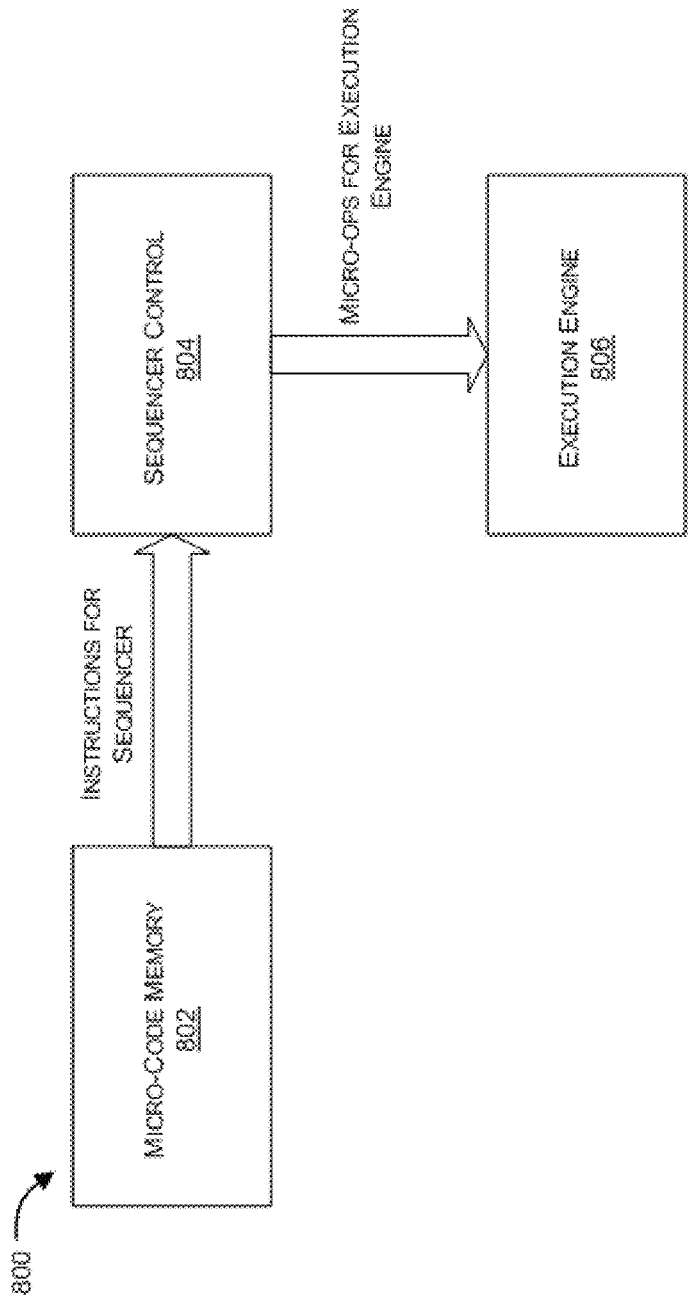
FIG. 8A illustrates an example block diagram of a network element than can be configured to run a micro-coded finite state machine in accordance with an embodiment of the present disclosure.

FIG. 8A illustrates an example block diagram 800 of a network element that can be configured to run a micro-coded finite state machine in accordance with an embodiment of the present disclosure. The intermediate network elements of SoC can be configured to use a finite state machine that can execute a preprogrammed command in a particular sequence as hard coded in the registers of finite state machine. Finite state machine can actually be implemented as sequencer that decodes a single set of instructions to execute a sequence that can include write/read/update of registers, wait for counter to expire or poll for register value. Intermediate network elements responsible for executing power profile management instructions can have a microcode memory 802 that stores pre-programmed micro-codes that need to be executed by the intermediate network element when a power profile change request is received by it. Finite state machine (FSM) of intermediate network element can issue instructions for sequencer controller 804 that can reorder execution sequence of power profile management instructions, and send micro-ops to the execution engine 806. The execution engine 806 can change the status of NoC elements accordingly.

According to one embodiment, finite state machine (FSM) sequencing can be controlled through a programmable instruction register, which can allow actual sequencing in the field to be controllable where individual steps of the sequence can be skipped, wait durations between sequence steps can be configured, etc. This can be useful for debugging and/or repairing of sequences on actual implementation (on silicon). Programmability can be achieved by design choices available, including implementation of the hardware as a micro-coded sequencer. In an aspect, FSM can actually be implemented as a sequencer to decode a simple set of instructions to execute a sequence that can include write/update registers, wait for counter to expire or poll for register values. The instructions that can be fed to the micro-sequencer can include micro-code instructions, which in turn can be programmed or patched on actual implementation.

Figure 8B:
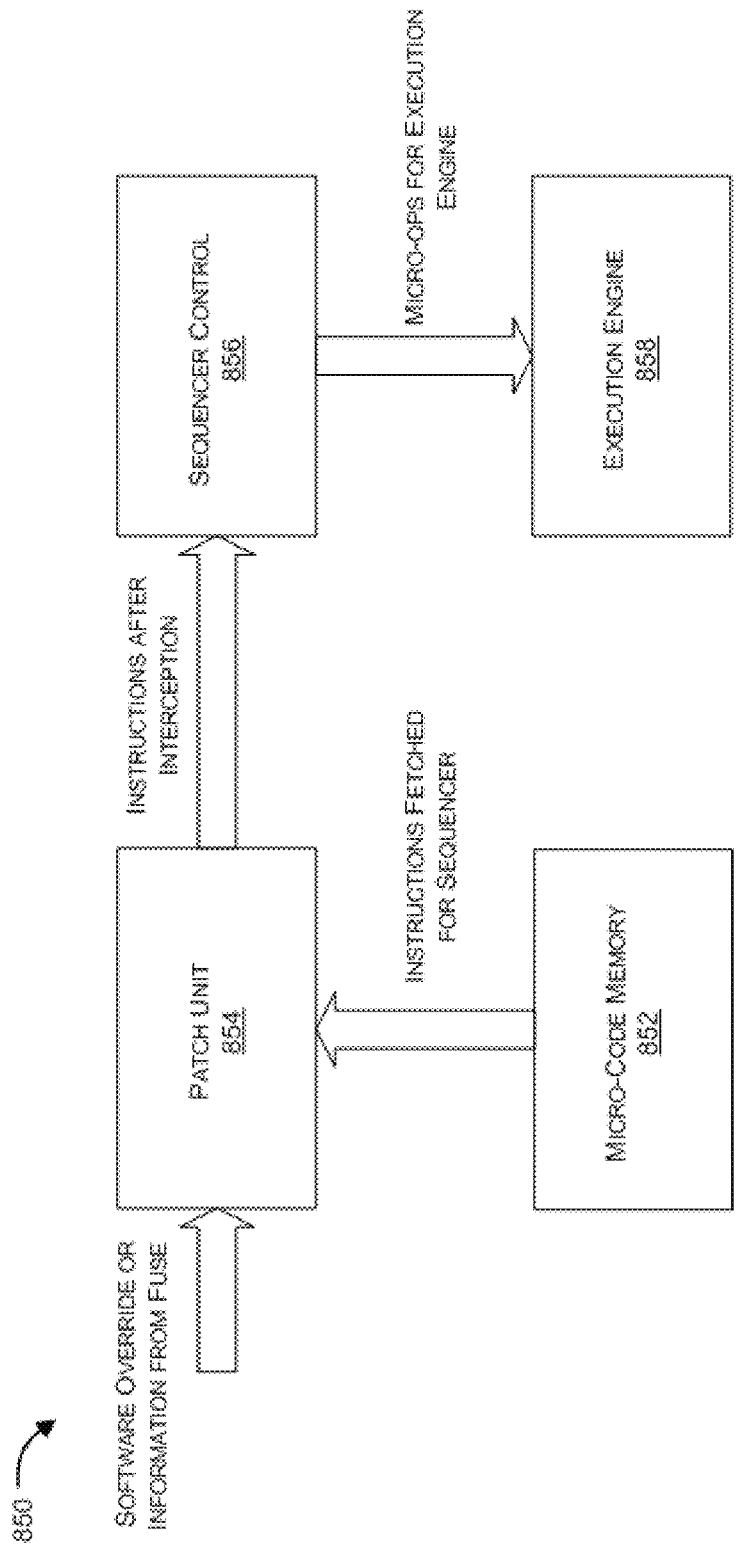
FIG. 8B illustrates an example block diagram of a network element that can be configured to run a field programmable finite state machine in accordance with an embodiment of the present disclosure.

FIG. 8B illustrates another example block diagram 850 of a network element that can be configured to run a field programmable finite state machine in accordance with an embodiment of the present disclosure. Intermediate network elements of SoC can be configured to use a finite state machine that executes dynamically programmed instructions that allow actual sequence in the field to be controllable where individual steps of the sequence can be skipped, wait duration between sequence steps/instructions can be configured. The micro-code instructions to be fed to the micro-sequencer can be programmed and/or patched dynamically in real-time. Pre-programmed instructions for switching power profile of NoC elements can be stored in micro-code memory 852 that can be fetched by a patch unit 854 to update or edit the micro-code. Patch unit 854 can receive software override instructions or information from fuses to update the micro-code. The updated instructions, after inception, can be forwarded to sequence controller 856 that can reorder the execution sequence of power profile management instructions, and send micro-ops to an execution engine 858, which can be configured to change the status of NoC elements accordingly.

According to one embodiment, software of the present disclosure can be used to configure the hardware sequencer to control finite state machine (FSM) behavior. The software can be loaded run-time in the implementation allowing complete control through software. In an aspect, the software can be baked into implementation as a ROM, wherein the software can be used as micro-code and might not be exposed to the end user of the implementation, in which case the repair can be done using fuses and/or patch rams. In this scheme, the portion of local copy of software can be baked into the implementation and can be overridden using information stored in fuses (static) or patch modules (programmable).

Figure 9:
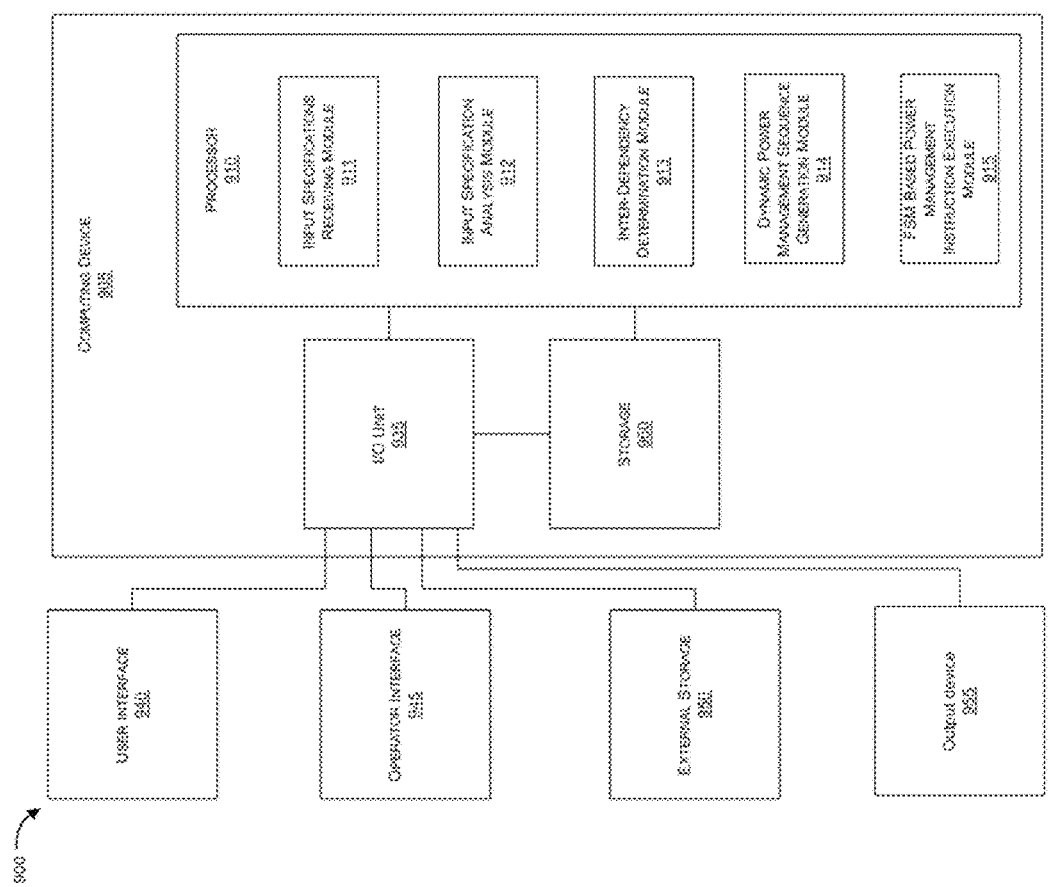
FIG. 9 illustrates an example computer system on which example implementations may be implemented.

FIG. 9 illustrates an example computer system 900 on which example implementations may be implemented. The computer system 900 includes a server 905 which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 940 and operator interfaces 945 which may utilize input devices such as a keyboard, mouse, touch device, or verbal command.

The server 905 may also be connected to an external storage 950, which can contain removable storage such as a portable hard drive, optical media (CD or DVD), disk media or any other medium from which a computer can read executable code. The server may also be connected an output device 955, such as a display to output data and other information to a user, as well as request additional information from a user. The connections from the server 905 to the user interface 940, the operator interface 945, the external storage 950, and the output device 955 may via wireless protocols, such as the 802.11 standards, Bluetooth® or cellular protocols, or via physical transmission media, such as cables or fiber optics. The output device 955 may therefore further act as an input device for interacting with a user.

The processor 910 may execute one or more modules including an input specification receipt module 911, an input specification analysis module 912, an inter-dependency determination module 913, a dynamic power management sequence generation module 914, and a FSM based power management instruction execution module 915, wherein the input specification receipt module 911 may be configured to receive one or more input specifications including SoC/NoC design, power profile specification containing voltage domain information, power domain information and power profile information, traffic flow information, retention logic requirement, one or more constrain of SoC and its component among other information that can be used for dynamically generating power sequence. In example implementation, the input specification receipt module 911 can also be configured to receive user input, current power status of one or more network element and any other external input.

According to one example implementation, input specification analysis module 912 can be configured to analyze input specifications, external input, and current power status of network elements to derive information such as present power status of the components, a list of components that need to change their power state (e.g. go ON/OFF), and a list of components that can change their power state in parallel. According to one example implementation, interdependency determination module 913 can be configured to determine power/communication dependency of components.

According to another example implementation, dynamic power management sequence generation module 914 can be configured to dynamically generate power management sequences for SoC to switch from one power profile to another. The dynamic power management sequence generation module 914 can be configured to generate a sequence of events or series of power profile management instructions for changing the power profile of entire SoC/NoC or power profile of individual components or a set of components or a particular region or segment of the SoC/NoC. Dynamic power management sequence generation module 914 can be configured to generate sequence of events or power profile management instructions that can be executed by the controller of SoC/NoC. In an example implementation, FSM based power management instruction execution module 915 can be configured to execute power profile management instructions at the hardware level. In an embodiment, FSM based power management instruction execution module 915 can use a preprogrammed micro-code for executing the power profile management instruction or can a use a dynamic micro-code for executing the power profile management instruction.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

We claim:

1. A hardware element of one or more of a System on Chip (SoC) and Network on Chip (NoC), the hardware element implemented at a second level of the one or more of a NoC and a SoC, the hardware element configured to:
   process instructions from a power manager to conduct a power state switching sequence for one or more first set of hardware elements to be configured in accordance with a power profile that are connected to the hardware element, wherein the power profile comprises a power state for each of the one or more first set of hardware elements, the power state indicative of the each of the one or more first set of hardware elements to be on or off,
   wherein the power state switching sequence comprises a sequence to power on or power off the one or more of the one or more other hardware elements.

2. The hardware element of claim 1, wherein the power state switching instructions are based on power profiles, a power domain, and a voltage domain of the one or more other hardware elements.

3. The hardware element of claim 1, wherein the power state switching instructions are communicated either using point to point signaling or through register updates.

4. The hardware element of claim 1, wherein the hardware element is configured to process the instructions from the power manager to conduct the power state switching sequence by managing one or more state changes of the one or more of the NoC and the SoC based on voltage and frequency.

5. The hardware element of claim 1 wherein the hardware element is configured to save the one or more states of the one or more of the NoC and the SoC, and to restore the one or more saved states of the one or more of the NoC and the SoC in response to an external instruction.

6. The hardware element of claim 1, wherein the hardware element is configured to process one or more interrupts.

7. The hardware element of claim 6, wherein the interrupt comprises instructions to abort a currently ongoing power state switching sequence.

8. The hardware element of claim 1, wherein the hardware element is configured to be overridden from performing one or more of steps of the power state switching sequence with one or more external instructions.

9. The hardware element of claim 1, wherein the hardware element is configured to communicate with one or more first level hardware elements to conduct the power state switching sequence based on instructions received from a power manager.

10. The hardware element of claim 1, wherein the hardware element is configured to communicate with another hardware element at a first level of the NoC and the Soc through dedicated sideband signals.

11. The hardware element of claim 1, wherein the hardware element is configured to dynamically sequence and schedule the power state switching sequence in response to one or more state changes of the one or more of the NoC and the SoC.

12. The hardware element of claim 1, wherein the hardware element comprises programmable logic.

13. The hardware element of claim 1, wherein the hardware element is configured to conduct one or more of a full micro-coded implementation of a finite state machine or a partial micro-coded implementation of a finite state machine.

14. The hardware element of claim 1, wherein the hardware element is configured to conduct a field repairable implementation of finite state machines using one or more of software, fuses, and patch rams.

15. A non-transitory computer readable medium, storing instructions for a hardware element of one or more of a System on Chip (SoC) and Network on Chip (NoC), the hardware element implemented at a second level of the one or more of a NoC and a SoC, the instructions comprising:
processing instructions from a power manager to conduct a power state switching sequence for one or more first set of hardware elements, that are connected to the hardware element, to be configured in accordance with a power profile, wherein the power profile comprises a power state for each of the one or more first set of hardware elements, the power state indicative of the each of the one or more first set of hardware elements to be on or off,
wherein the power state switching sequence comprises a sequence to power on or power off the one or more of the one or more other hardware elements.

16. The non-transitory computer readable medium of claim 15, wherein the power state switching instructions are based on power profiles, a power domain, and a voltage domain of the one or more other hardware elements.

17. The non-transitory computer readable medium of claim 15, wherein the power state switching instructions are communicated either using point to point signaling or through register updates.

18. The non-transitory computer readable medium of claim 15, wherein the instructions further comprise processing the instructions from the power manager to conduct the power state switching sequence by managing one or more state changes of the one or more of the NoC and the SoC based on voltage and frequency.

19. The non-transitory computer readable medium of claim 15, wherein the instructions further comprise saving the one or more states of the one or more of the NoC and the SoC, and restoring the one or more saved states of the one or more of the NoC and the SoC in response to an external instruction.

20. The non-transitory computer readable medium of claim 15, wherein the instructions further comprise processing one or more interrupts.

* * * * *